United States Patent
Uemura et al.

(10) Patent No.: US 9,913,287 B2
(45) Date of Patent: Mar. 6, 2018

(54) TERMINAL APPARATUS, BASE STATION APPARATUS, AND CONTROL METHODS FOR SECONDARY CELLS

(71) Applicant: SHARP KABUSHIKI KAISHA, Osaka-shi, Osaka (JP)

(72) Inventors: Katsunari Uemura, Osaka (JP); Yasuyuki Kato, Osaka (JP); Hidekazu Tsuboi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 105 days.

(21) Appl. No.: 14/905,210

(22) PCT Filed: Jul. 1, 2014

(86) PCT No.: PCT/JP2014/067528
§ 371 (c)(1),
(2) Date: Jan. 14, 2016

(87) PCT Pub. No.: WO2015/008616
PCT Pub. Date: Jan. 22, 2015

(65) Prior Publication Data
US 2016/0165627 A1  Jun. 9, 2016

(30) Foreign Application Priority Data
Jul. 19, 2013  (JP) ................ 2013-150100

(51) Int. Cl.
*H04W 72/12* (2009.01)
*H04W 76/02* (2009.01)
(Continued)

(52) U.S. Cl.
CPC ... *H04W 72/1268* (2013.01); *H04W 72/0446* (2013.01); *H04W 76/025* (2013.01); *H04W 76/046* (2013.01)

(58) Field of Classification Search
CPC .......... H04W 72/1268; H04W 76/025; H04W 72/0446; H04W 76/046
See application file for complete search history.

(56) References Cited

U.S. PATENT DOCUMENTS

| | | | | |
|---|---|---|---|---|
| 2011/0039574 A1* | 2/2011 | Charbit | ............... | G01S 5/0215 455/456.1 |
| 2016/0029233 A1* | 1/2016 | Kollar | ................ | H04W 24/08 370/252 |
| 2016/0157219 A1* | 6/2016 | Uemura | ............ | H04W 16/00 370/329 |

FOREIGN PATENT DOCUMENTS

| | | | | |
|---|---|---|---|---|
| JP | WO 2013069625 A1 * | 5/2013 | ........... | H04B 7/024 |
| WO | WO 2012/031121 A1 | 3/2012 | | |
| WO | WO 2012/138143 A2 | 10/2012 | | |

OTHER PUBLICATIONS

"Control Plane Architecture", R2-131778, MediaTek Inc., 3GPP TSG-RAN2 #82 Meeting, Fukuoka, Japan, May 20-24, 2013, total 3 pages, http://www.3gpp.org/ftp/tsg_ran/WG2_RL2/TSGR2_82/Docs/.

(Continued)

*Primary Examiner* — Omar Ghowrwal
(74) *Attorney, Agent, or Firm* — Birch, Stewart, Kolasch & Birch, LLP

(57) ABSTRACT

Provided is a technique related to a terminal apparatus, a base station apparatus, a communication system, a control method, and an integrated circuit, which efficiently controls a state of a cell for a plurality of cells. In the terminal apparatus using a plurality of cells, configuration information which disables change in a state of a cell is received from the base station apparatus, and control is performed based on the received configuration information so that a state of a part of cells among the plurality of cells is not changed.

6 Claims, 7 Drawing Sheets

(51) Int. Cl.
*H04W 72/04* (2009.01)
*H04W 76/04* (2009.01)

(56) References Cited

OTHER PUBLICATIONS

"Deployment scenarios and design goals for dual connectivity", R2-130444, NTT Docomo, Inc., 3GPP TSG-RAN WG2 #81, St. Julian's, Malta, Jan. 28-Feb. 1, 2013, total 6 pages, http://www.3gpp.org/ftp/tsg_ran/WG2_RL2/TSGR2_81/Docs/.

* cited by examiner

TERMINAL APPARATUS, BASE STATION APPARATUS, AND CONTROL METHODS FOR SECONDARY CELLS

TECHNICAL FIELD

Embodiments of the present invention relate to a technique of a terminal apparatus, a base station apparatus, a communication system, a control method, and an integrated circuit which efficiently control a state of a cell.

This application claims priority based on Japanese Patent Application No. 2013-150100 filed in Japan on Jul. 19, 2013, the content of which is incorporated herein.

BACKGROUND ART

In 3GPP (3rd Generation Partnership Project) which is a standardization project, standardization of Evolved Universal Terrestrial Radio Access (hereinafter referred to as EUTRA) is performed, in which high speed communication is realized by adopting an OFDM (Orthogonal Frequency-Division Multiplexing) communication scheme and flexible scheduling with a predetermined frequency and time unit called a resource block.

Moreover, in the 3GPP, a discussion on Advanced EUTRA that realizes higher-speed data transmission and has an upward compatibility with the EUTRA has been carried out. In the EUTRA, a communication system is premised to have a network in which base station apparatuses are composed of substantially the same cell configurations (cell sizes), but in the Advanced EUTRA, a discussion has been carried out on a communication system that is premised to have a network (Heterogeneous Network) in which base station apparatuses (cells) having different configurations are mixed in the same area.

A technique that, in a communication system in which cells (macro cells) having a large cell radius and cells (small cells) having a smaller cell radius than that of the macro cells are arranged like the heterogeneous network, a terminal apparatus performs communication by connecting to the macro cells and the small cells at the same time (dual connectivity) is discussed (NPL 1).

In NPL 1, discussion has been carried out with a network premised that when a terminal apparatus tries to realize dual connectivity with a cell (macro cell) having a large cell radius (cell size) and a cell (small cell) having a small cell radius, a delay is caused because of low speed of a backbone line (Backhaul) between the macro cell and the small cell. That is, when control information or user information which is exchanged between the macro cell and the small cell is delayed, the function which has been able to be realized conventionally in the dual connectivity may become unable to be realized or difficult to be realized.

For example, though one base station apparatus has centrally controlled packet scheduling of a plurality of cells conventionally, in the case of performing such centralized control in the network in which there is a delay in the backbone line, optimum scheduling in which wireless condition is reflected may not be performed. Thus, a method for controlling packet scheduling in a distributed manner by causing both of a base station apparatus of a macro cell and a base station apparatus of a small cell to have a dynamic resource allocation function is being discussed (NPL 2).

CITATION LIST

Non Patent Document

[NON PATENT DOCUMENT 1] "Deployment scenarios and design goals for dual connectivity", total 6 pages, R2-130444, NTT DOCOMO, INC., 3GPP TSG RAN2#81, St. Julian's, Malta, Jan. 28-Feb. 1, 2013.

[NON PATENT DOCUMENT 2] "Control Plane Architecture", total 3 pages, R2-131778, MediaTek Inc., 3GPP TSG RAN2#82 Meeting, Fukuoka, Japan, May 20-24, 2013.

DISCLOSURE OF THE INVENTION

Problems to be Solved by the Invention

As described in, for example, NPL 2, by performing distributed packet scheduling between the base station apparatuses, a terminal apparatus may transmit feedback information directly to each of the base station apparatuses without using a backbone line between the base station apparatuses. However, when the base station apparatuses perform the distributed packet scheduling, a problem is caused that states of cells managed by the base station apparatuses are difficult to be grasped mutually.

That is, when different base station apparatuses are connected by dual connectivity, as to states of a plurality of cells allocated to a terminal apparatus, each of the base station apparatuses may grasp (recognize) states of cells managed by the base station apparatus itself, but it is difficult to grasp states of cells managed by the other base station apparatuses. Thus, inconsistency of states may occur in the states of the cells between the base station apparatuses and the terminal apparatus.

More specifically, since each base station apparatus may not grasp the states of the cells which are not managed by the base station apparatus itself, the base station apparatuses may deactivate a cell which is being activated (under scheduling), or may activate a cell which is being deactivated (not under scheduling) to the contrary. In this manner, when it is difficult to control states of cells for a terminal apparatus centrally by one base station apparatus, such a problem is caused that scheduling of the base station apparatuses becomes inefficient and a throughput of the terminal apparatus is reduced.

An object of embodiments of the invention is to solve at least one of the problems described above by providing a technique related to a terminal apparatus, a base station apparatus, a communication system, a control method, and an integrated circuit capable of efficiently controlling a state of a cell.

Means for Solving the Problems

In order to achieve the aforementioned object, the following means is taken. That is, a terminal apparatus in an embodiment of the invention is a terminal apparatus using a plurality of cells, which includes a method in which one or more cells are added based on information transmitted from a base station apparatus, and control is performed so that a timer that is intended to be applied to the added cells and that deactivates a cell, which has been activated, in a case of expiration of the timer, is not applied to a part of the cells which are added.

Moreover, in the terminal apparatus in the embodiment of the invention, the part of the cells, to which the timer is not applied, may be notified from the base station apparatus by using an RRC message.

Moreover, in the terminal apparatus in the embodiment of the invention, the part of the cells, to which the timer is not applied, may be one of secondary cells which are connected by using dual connectivity.

Moreover, a base station apparatus in an embodiment of the invention is a base station apparatus which is connected to a terminal apparatus using a plurality of cells, including a method in which addition of one or more cells is notified to the terminal apparatus, and in a case of notifying the addition of the cells, a timer that is applied in the terminal apparatus to cells other than a part of the cells which are notified and that deactivates a cell, which has been activated, in a case of expiration of the timer, is notified.

Moreover, the base station apparatus in the embodiment of the invention is the base station apparatus which is connected to the terminal apparatus using the plurality of cells, including a method in which the part of the cells, to which the timer is not applied, is notified to the terminal apparatus by using an RRC message.

Moreover, in the base station apparatus in the embodiment of the invention, the part of the cells, to which the timer is not applied, may be one of secondary cells which are connected by using dual connectivity.

Moreover, a communication system in an embodiment of the invention is a communication system which includes a method in which in a case of notifying addition of one or more cells to a terminal apparatus, a base station apparatus notifies a timer that is applied in the terminal apparatus to cells other than a part of the cells which are notified and that deactivates a cell, which has been activated, in a case of expiration of the timer, and the terminal apparatus adds the one or more cells based on information transmitted from the base station apparatus, and performs control so that the timer that deactivates a cell, which has been activated, in a case of expiration of the timer, is not applied to a part of the cells which are added.

Moreover, a control method of a terminal apparatus in an embodiment of the invention is a control method of a terminal apparatus using a plurality of cells, including at least: a step of adding one or more cells based on information transmitted from a base station apparatus; and a step of performing control so that a timer that is intended to be applied to the added cells and that deactivates a cell, which has been activated, in a case of expiration of the timer, is not applied to a part of the cells which are added.

Moreover, a control method of a base station apparatus in an embodiment of the invention is a control method of a base station apparatus which is connected to a terminal apparatus using a plurality of cells, including at least: a step of notifying addition of one or more cells to the terminal apparatus; and a step of, in a case of notifying the addition of the cells, notifying a timer that is applied in the terminal apparatus to cells other than a part of the cells which are notified, and that deactivates a cell, which has been activated, in a case of expiration of the timer.

Moreover, an integrated circuit of a terminal apparatus in an embodiment of the invention is an integrated circuit mounted in a terminal apparatus using a plurality of cells, causing the terminal apparatus to exert a series of functions including: adding in the terminal apparatus one or more cells based on information transmitted from a base station apparatus; and performing control so that a timer that is intended to be applied to the added cells and that deactivates a cell, which has been activated, in a case of expiration of the timer, is not applied to a part of the cells which are added.

Moreover, an integrated circuit of a base station apparatus in an embodiment of the invention is an integrated circuit mounted in a base station apparatus which is connected to a terminal apparatus using a plurality of cells, causing the base station apparatus to exert a series functions including: notifying addition of one or more cells to the terminal apparatus; and, in a case of notifying the addition of the cells, notifying a timer that is applied in the terminal apparatus to cells other than a part of the cells which are notified and that deactivates a cell, which has been activated, in a case of expiration of the timer.

In this specification, although each embodiment is disclosed in terms of a technique related to a terminal apparatus, a base station apparatus, a communication system, a control method, and an integrated circuit which efficiently control a state of a cell, a communication scheme which may be applied to each embodiment is not limited to EUTRA or a communication scheme having compatibility with EUTRA such as Advanced EUTRA.

For example, the technique described in this specification may be used in various communication systems using code division multiple access (CDMA), time division multiple access (TDMA), frequency division multiple access (FDMA), orthogonal FDMA (OFDMA), single carrier FDMA (SC-FDMA), other access scheme, and the like. In addition, in this specification, a system and a network may be used synonymously.

Effects of the Invention

According to the embodiments of the invention, it is possible to provide a technique related to a terminal apparatus, a base station apparatus, a communication system, a control method, and an integrated circuit capable of efficiently controlling a state of a cell.

MODE FOR CARRYING OUT THE INVENTION

Figure 1:
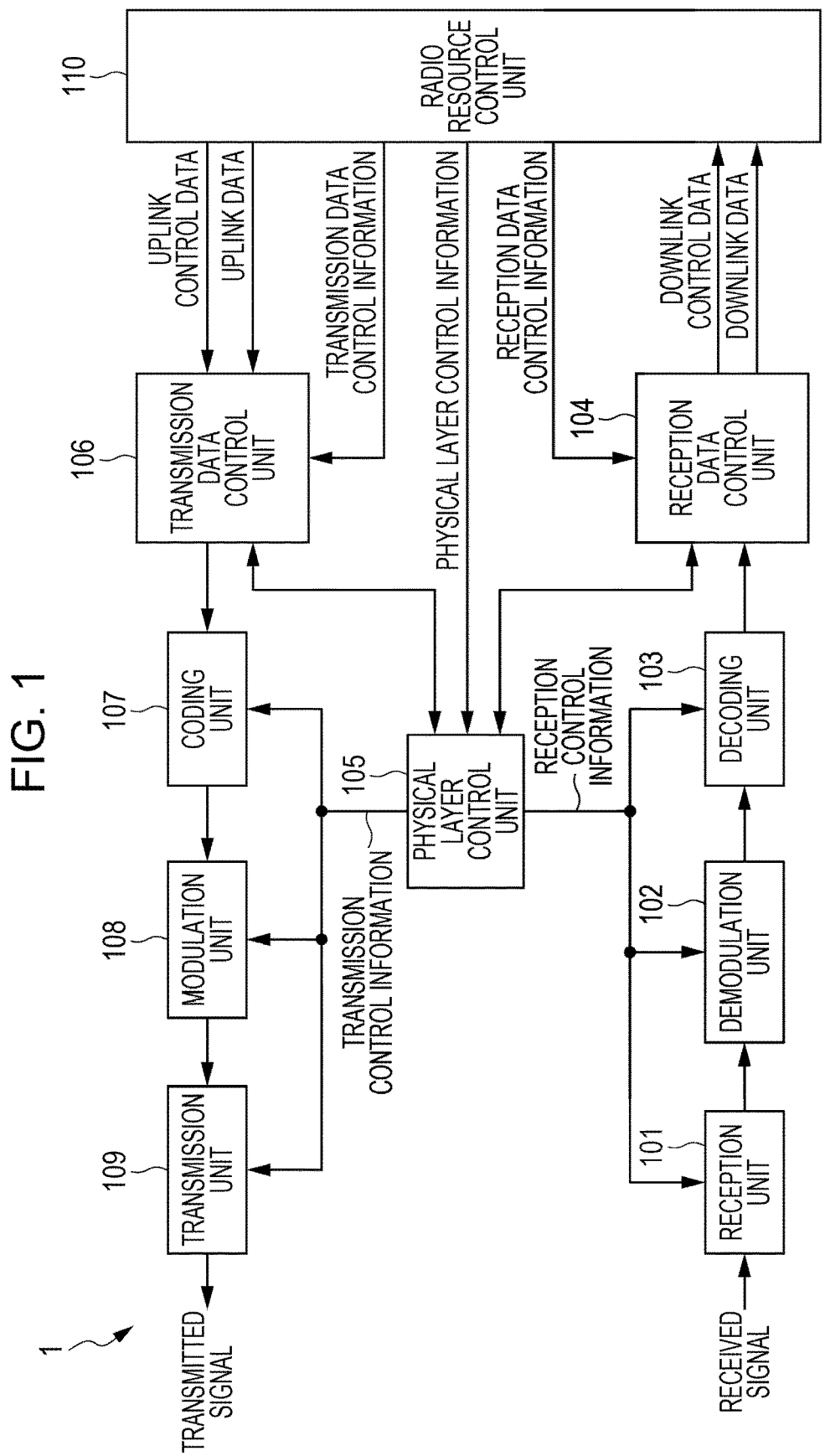
FIG. 1 is a block diagram illustrating one example of a schematic configuration of a terminal apparatus according to an embodiment of the invention.

A technique related to each embodiment of the invention will be briefly described below.

[Physical Channel/Physical Signal]

Description will be given for a physical channel and a physical signal which are primarily used in EUTRA and Advanced EUTRA. A channel means a medium used for signal transmission and reception, and a physical channel means a physical medium used for signal transmission and reception. In the invention, a physical channel and a signal may be used synonymously. There is a possibility that in the EUTRA and the Advanced EUTRA, a physical channel is added or a structure or a format style thereof is modified or added in the future, but, even in the case of modification or addition, there is no influence on description of each embodiment of the invention.

In the EUTRA and the Advanced EUTRA, scheduling of the physical channel or the physical signal is managed by using a radio frame. One radio frame is 10 ms and one radio frame consists of ten subframes. Further, one subframe is configured by two slots (that is, one subframe has 1 ms and one slot has 0.5 ms). Moreover, management is performed by using a resource block as a minimum unit of scheduling, in which physical channels are arranged. The resource block is defined as a fixed frequency domain in which a frequency axis is configured by an assembly of a plurality of subcarriers (for example, twelve subcarriers) and a domain configured by a fixed transmission time interval (one slot).

Synchronization signals are configured by three types of primary synchronization signals and secondary synchronization signals which are configured by 31 types of codes which are arranged alternately in a frequency domain, and a combination of signals of the primary synchronization signals and the secondary synchronization signals indicates 504 cell identifiers (physical cell ID (Physical Cell Identity; PCI)) that identify a base station apparatus and a frame timing for radio synchronization. A terminal apparatus specifies a physical cell ID of synchronization signals received by cell search.

A physical broadcast channel (PBCH) is transmitted for the purpose of notifying (configuring) a control parameter (broadcast information (system information)) which is commonly used in terminal apparatuses in a cell. Regarding broadcast information which is not notified by the physical broadcast channel, a radio resource whose broadcast information is transmitted is notified to the terminal apparatus in a cell by a physical downlink control channel, and in the notified radio resource, a layer 3 message (system information) for notifying the broadcast information is transmitted by a physical downlink shared channel.

As the broadcast information, a cell global identifier (CGI) indicating an identifier of an individual cell, a tracking area identifier (TAI) for managing a standby area by paging, random access configuration information, transmission timing adjustment information, shared radio resource configuration information in the cell, neighboring cell information, uplink access limit information or the like is notified.

Downlink reference signals are classified into a plurality of types depending on intended use thereof. For example, cell-specific RSs (cell-specific reference signals) are pilot signals which are transmitted with predetermined power for each cell, and are downlink reference signals which are iterated periodically in a frequency domain and a time domain based on a predetermined rule. The terminal apparatus measures reception quality for each cell by receiving the cell-specific RSs. Moreover, the terminal apparatus uses the cell-specific RSs also as reference signals for demodulation of the physical downlink control channel or the physical downlink shared channel that is transmitted at the same time with the cell-specific RSs. As a sequence used for the cell-specific RSs, a sequence which is identifiable for each cell is used.

The downlink reference signals are used also for estimation of channel fluctuation of the downlink. The downlink reference signals used for estimation of channel fluctuation is referred to as channel state information reference signals (CSI-RSs). The downlink reference signals which are configured individually to the terminal apparatus is referred to as UE specific reference signals (URSs), Demodulation Reference Signals (DMRSs), or dedicated RSs (DRSs), and referred to for channel compensation processing of a channel when the physical downlink control channel, an enhanced physical downlink control channel, or the physical downlink shared channel is demodulated.

The physical downlink control channel (PDCCH) is transmitted in several OFDM symbols (for example, 1 to 4 OFDM symbols) from beginning of each subframe. The enhanced physical downlink control channel (EPDCCH) is a physical downlink control channel which is arranged in an OFDM symbol in which the physical downlink shared channel PDSCH is arranged. The PDCCH or the EPDCCH is used for the purpose of notifying radio resource allocation information in accordance with scheduling of a base station apparatus and information for giving instruction of an adjustment amount of increase and decrease in transmit power to the terminal apparatus. Hereinafter, when simply described as the physical downlink control channel (PDCCH), it means both physical channels of the PDCCH and the EPDCCH unless otherwise specified.

The terminal apparatus needs to acquire radio resource allocation information called uplink grant in a case of transmission and downlink grant (downlink assignment) in a case of reception from the physical downlink control channel by monitoring the physical downlink control channel addressed to the terminal apparatus itself before transmitting or receiving a layer 2 message and a layer 3 message (paging, hand-over command, and the like) that are downlink data or downlink control data, and by receiving the physical downlink control channel addressed to the terminal apparatus. Note that, the physical downlink control channel may be configured so as to be, other than to be transmitted in the OFDM symbols described above, transmitted in a domain of a resource block allocated from the base station apparatus to the terminal apparatus in an individual (dedicated) manner.

A physical uplink control channel (PUCCH) is used for performing a reception confirmation response (ACK/NACK; Acknowledgement/Negative Acknowledgement) of downlink data transmitted on the physical downlink shared channel, channel (channel state) information (CSI; Channel State Information) of the downlink, and a radio resource allocation request (radio resource request, scheduling request (SR)) of the uplink.

CSI includes a CQI (Channel Quality Indicator), a PMI (Precoding Matrix Indicator), a PTI (Precoding Type Indicator), and an RI (Rank Indicator). Each indicator may be described as indication.

The physical downlink shared channel (PDSCH) is used also for notifying the terminal apparatus of, in addition to the downlink data, broadcast information (system information) which is not notified by paging or the physical broadcast channel as the layer 3 message. Radio resource allocation information of the physical downlink shared channel is indicated by the physical downlink control channel. The physical downlink shared channel is arranged and transmitted in the OFDM symbol other than the OFDM symbol in which the physical downlink control channel is transmitted. That is, the physical downlink shared channel and the physical downlink control channel are subjected to time division multiplexing in one subframe.

A physical uplink shared channel (PUSCH) mainly transmits uplink data and uplink control data, and may include control data such as CSI and ACK/NACK. Moreover, it is used also for notifying the base station apparatus of uplink control information, in addition to the uplink data, as the layer 2 message and the layer 3 message from the terminal apparatus. Similarly to the case of the downlink, radio resource allocation information of the physical uplink shared channel is indicated by the physical downlink control channel.

An uplink reference signal (also referred to as an uplink pilot signal or an uplink pilot channel) includes a demodulation reference signal (DMRS) which is used by the base station apparatus for demodulating the physical uplink control channel PUCCH and/or the physical uplink shared channel PUSCH, and a sounding reference signal (SRS) which is used by the base station apparatus mainly for estimating a channel state of the uplink. As the sounding reference signal, there are a periodic sounding reference signal (Periodic SRS) which is transmitted periodically and an aperiodic sounding reference signal (Aperiodic SRS) which is transmitted when an instruction is given from the base station apparatus.

A physical random access channel (PRACH) is a channel which is used for notifying (configuring) a preamble sequence and has a guard time. The preamble sequence is configured so as to notify the base station apparatus of information by a plurality of sequences. For example, when sixty four types of sequences are prepared, it is possible to indicate 6-bit information to the base station apparatus. The physical random access channel is used as access means to the base station apparatus from the terminal apparatus.

The terminal apparatus uses the physical random access channel, for example, for making a radio resource request of the uplink when the physical uplink control channel is not configured, or requesting transmission timing adjustment information (also called timing advance (TA)) which is required for aligning an uplink transmission timing to a reception timing window of the base station apparatus to the base station apparatus. Moreover, the base station apparatus may request the terminal apparatus to initiate random access procedure by using the physical downlink control channel.

The layer 3 message is a message handled by a protocol of a control-plane (CP (C-Plane)) which is exchanged between RRC (radio resource control) layers of the terminal apparatus and the base station apparatus, and may be used synonymously with RRC signaling or an RRC message. Note that, against the control-plane, a protocol handling user data is referred to as a user-plane (UP (U-Plane)).

Note that, since physical channels or physical signals other than above are not concerned with each embodiment of the invention, detailed description thereof will be omitted. Examples of the physical channels and the physical signals whose description will be omitted include a physical control format indicator channel (PCFICH), a physical HARQ indicator channel (PHICH: Physical hybrid ARQ indicator channel), and a physical multicast channel (PMCH).

[Radio Network]

A communication available range (communication area) of each frequency which is controlled by the base station apparatus is regarded as a cell. In this case, respective communication areas covered by the base station apparatus may have different areas and different shapes for each frequency. Moreover, areas which are covered may be different for each frequency. A radio network in which cells which are different in types of base station apparatuses and sizes of cell radius are mixed in areas with the same frequency or different frequencies to form one communication system is referred to as a heterogeneous network.

The terminal apparatus operates by regarding inside of a cell as a communication area. When the terminal apparatus moves from a certain cell to another cell, the movement is performed to another suitable cell with cell re-selection procedure at the time of non-radio connection (not under communication) or with handover procedure at the time of radio connection (under communication). The suitable cell is generally a cell which is judged, based on information specified from the base station apparatus, that access of the terminal apparatus is not prohibited, and indicates a cell in which reception quality of the downlink fulfills a predetermined condition.

The base station apparatus manages a cell which is an area in which the terminal apparatus may communicate with the base station apparatus for each frequency. One base station apparatus may manage a plurality of cells. A cell is classified into a plurality of types according to a size of an area (cell size) in which communication is allowed with the terminal apparatus. For example, a cell is classified into a macro cell and a small cell. The small cell is a cell which generally covers from several meters to several tens of meters of a radius. Further, the small cell is classified into a femto cell, a pico cell, a nano cell, and the like according to a size of an area thereof in some cases.

When the terminal apparatus is able to communicate with a certain base station apparatus, a cell which is configured so as to be used for communication with the terminal apparatus is a serving cell and other cell which is not used for the communication is referred to as a neighboring cell among cells of the base station apparatus.

[Primary Cell, Secondary Cell]

Moreover, a technique of aggregating frequencies (component carriers or frequency bands) of a plurality of different frequency bands and dealing with them as one frequency (frequency band) by carrier aggregation may be applied to the terminal apparatus and the base station apparatus. In the carrier aggregation, as the component carriers, there are an uplink component carrier coping with uplink and a downlink component carrier coping with downlink. In this specification, a frequency and a frequency band may be used synonymously.

For example, when five component carriers each having a frequency bandwidth of 20 MHz are aggregated by the carrier aggregation, a terminal apparatus having capability which allows the carrier aggregation performs transmission and reception by regarding the aggregated component carriers to have a frequency bandwidth of 100 MHz. Note that, the component carriers which are aggregated may be contiguous frequencies or frequencies the entire or a part of which are not contiguous. For example, when available frequency bands are an 800 MHz band, a 2 GHz band, and a 3.5 GHz band, a certain component carrier may be transmitted in the 800 MHz band, another component carrier may be transmitted in the 2 GHz band, and still another component carrier may be transmitted in the 3.5 GHz band.

It is also possible to aggregate a plurality of contiguous or non-contiguous component carriers in the same frequency band. The frequency bandwidth of each component carrier may be a frequency bandwidth (for example, 5 MHz or 10 MHz) narrower than a receivable frequency bandwidth (for example, 20 MHz) of the terminal apparatus, and respective frequency bandwidths for aggregation may be different from each other. It is desired that the frequency bandwidth be equal to any conventional frequency bandwidth of a cell by considering backward compatibility, but may have the frequency bandwidth different from the conventional frequency bandwidth of a cell.

Component carriers (carrier types) having no backward compatibility may be aggregated by carrier aggregation. The component carrier having no backward compatibility is also referred to as a new carrier type (NCT). Note that, the number of uplink component carriers allocated (configured, added) to the terminal apparatus by the base station apparatus is desired to be the same as or less than the number of downlink component carriers.

The terminal apparatus and the base station apparatus manage a cell that is constituted by a certain uplink component carrier and the downlink component carrier that is connected to this uplink component carrier in a cell-specific manner, as a primary cell (PCell). In addition, the terminal apparatus and the base station apparatus manage a cell that is constituted by a component carrier other than the primary cell as a secondary cell (SCell).

The terminal apparatus performs reception of a paging message, detection of broadcast information updating, initial access procedure, a configuration of security information and the like in the primary cell, but they may not be performed in the secondary cell. The primary cell and the secondary cell are collectively referred to as serving cells.

Although the primary cell is not subjected to control of activation and deactivation (that is, the primary cell is always regarded as being activated), the secondary cell has states of the cell as activation and deactivation according to activity. Regarding the states of the cell, a state of being activated and a state of being deactivated are also referred to as an activated state and a deactivated state, respectively. For the state of the cell (secondary cell), a change of the state may be explicitly designated (notified, instructed) from the base station apparatus, or the state may be changed based on timer information (secondary cell deactivation timer; deactivation timer) counting the time by the terminal apparatus for each component carrier (secondary cell) in some cases.

Control associated with activation and/or deactivation of a secondary cell will be described. The base station apparatus notifies the terminal apparatus of a command indicating activation and/or deactivation of a secondary cell. This command is transmitted to the terminal apparatus as an MAC control element (MAC-CE) included in an MAC PDU (Protocol data unit) to be decoded in an MAC layer.

The command indicating activation and/or deactivation of the secondary cell will be described in detail by using FIG. 8. The terminal apparatus receives, as the MAC control element indicating activation and/or deactivation (Activation/Deactivation MAC control element) of the secondary cell, a bit array of one octet (eight bits) notified with a format (bit structure (configuration)) of FIG. 8. A field of "R" in the figure is a reserve bit and has 0 (zero). Note that, FIG. 8 may be understood as a command indicating the state of the secondary cell which has been regarded as being activated and/or deactivated by the terminal apparatus.

A field of "C(i)" (i=1 to 7) is bit map information indicating instruction information about activation and/or deactivation for the state of the secondary cell with a logical value. i denotes an index number of the secondary cell and is notified to the terminal apparatus from the base station apparatus when the secondary cell is configured (allocated). When the logical value of the field of "C(i)" is 1, the terminal apparatus brings the secondary cell corresponding to the index i into an activated state. On the other hand, when the logical value of the field of "C(i)" is 0 (zero), the terminal apparatus brings the secondary cell corresponding to the index i into a deactivated state. When the secondary cell corresponding to the index i is not configured to the terminal apparatus, the terminal apparatus ignores the value of the index i.

In the field of C(i), when activation (that is, 1) is set to the activated secondary cell and when deactivation (that is, 0 (zero)) is set to the deactivated secondary cell, the terminal apparatus keeps the state of the corresponding cell as it is.

Further, the terminal apparatus starts (or restarts) a secondary cell deactivation timer upon the activated secondary cell to count the time. That is, the secondary cell deactivation timer is counted for each activated secondary cell. When the secondary cell deactivation timer expires, the terminal apparatus deactivates the corresponding secondary cell. To the secondary cell deactivation timer, an initial value which is common in all secondary cells configured to the terminal apparatus is applied. When uplink grant or downlink assignment is notified by the PDCCH, the secondary cell deactivation timer is restarted in the secondary cell which has received the PDCCH, the secondary cell to which a radio resource is allocated by the PDCCH, or both of these secondary cells.

The terminal apparatus initiates transmission of SRS and reporting of CSI in the activated secondary cell. Further, the terminal apparatus initiates monitoring of PDCCH of the activated secondary cell and monitoring of PDCCH of a cell which is used for scheduling of the activated secondary cell. On the other hand, in the deactivated secondary cell, the terminal apparatus stops transmission of SRS, reporting of CSI, transmission of uplink data, initiating of random access procedure, monitoring of PDCCH of the corresponding secondary cell, and monitoring of PDCCH of a cell which is used for scheduling of the corresponding secondary cell.

Note that, the carrier aggregation is communication with a use of a plurality of cells by using a plurality of component carriers (frequency bands), and is also referred to as cell aggregation. Note that, the terminal apparatus may be radio-connected to the base station apparatus through a relay station apparatus (or repeater) for each frequency. That is, the base station apparatus of the each embodiment of the invention may be substituted with a relay station apparatus.

[Dual Connectivity]

Figure 9:
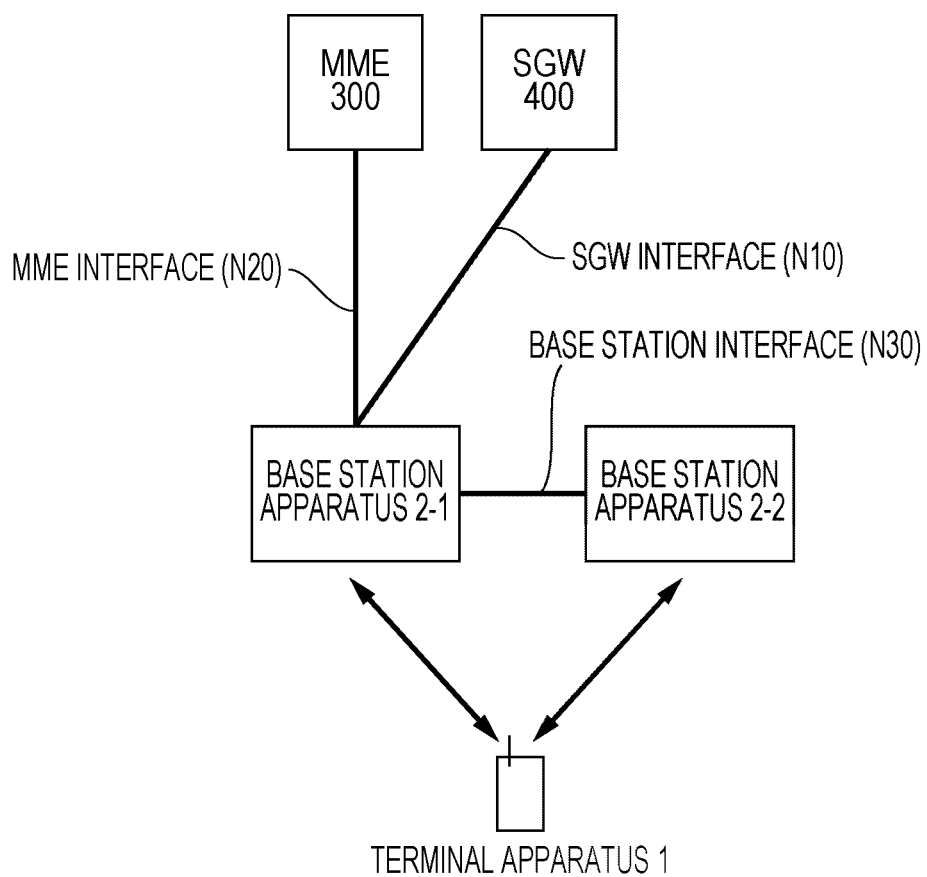
FIG. 9 is a view illustrating one example of architecture of dual connectivity according to an embodiment of the invention.
Figure 10:
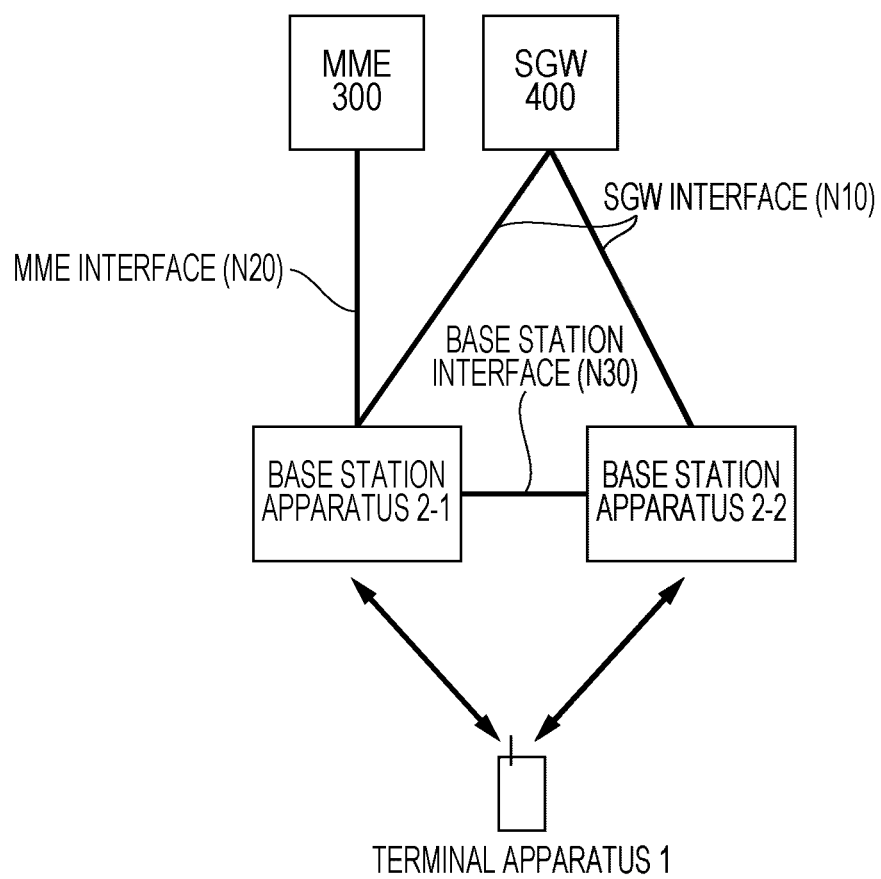
FIG. 10 is a view illustrating another example of architecture of dual connectivity according to an embodiment of the invention.

Referring to FIG. 9 and FIG. 10, a basic structure (architecture) of the dual connectivity will be described. FIG. 9 and FIG. 10 illustrate that a terminal apparatus 1 is connected to a plurality of base station apparatuses 2 (which are indicted as a base station apparatus 2-1 and a base station apparatus 2-2 in the figures) simultaneously. It is considered that the base station apparatus 2-1 is a base station apparatus which constitutes a macro cell and the base station apparatus 2-2 is a base station apparatus which constitutes a small cell. Such simultaneous connection of the terminal apparatus 1 by using a plurality of cells belonging to the plurality of base station apparatuses 2 is referred to as the dual connectivity, and connection of the terminal apparatus 1 and the plurality of base station apparatuses 2 by using a technique for realizing the dual connectivity will be described by using expressions of "using the dual connectivity", "connection by the dual connectivity", or an expression synonymous with them. The cells belonging to the respective base station apparatuses 2 may be operated at the same frequency or may be operated at different frequencies.

Note that, the carrier aggregation is different from connection by the dual connectivity in that a plurality of cells are managed by one base station apparatus 2 and frequencies of the cells are different from each other, and that a backbone line speed of which is so high that influence of a delay does not need to be considered is used between the plurality of cells. In other words, the carrier aggregation is a technique for connecting one terminal apparatus 1 and one base station apparatus 2 through a plurality of cells having different frequencies, while the dual connectivity is a technique for connecting one terminal apparatus 1 and a plurality of base station apparatuses 2 through a plurality of cells having the same or different frequencies.

In the terminal apparatus 1 and the base station apparatuses 2, the technique applied to the carrier aggregation may be applied to the dual connectivity. For example, the terminal apparatus 1 and the base station apparatuses 2 may apply techniques of management (addition, deletion, modification or the like) of the primary cell and the secondary cell, a measurement method and a measurement event configuration, which correspond to the carrier aggregation, activation/deactivation, and the like, to cells connected by the dual connectivity.

In FIG. 9 and FIG. 10, the base station apparatus 2-1 or the base station apparatus 2-2 is connected to an MME 300 and an SGW 400 thorough a backbone line. The MME 300 is a control station apparatus in a higher core network than the base station apparatus 2, which corresponds to MME (Mobility Management Entity), and has a function of mobility management and authentication control (security control) for the terminal apparatus 1, configuring a path of user data with respect to the base station apparatuses 2, etc. The SGW 400 is a control station apparatus in a higher core network, which corresponds to Serving Gateway (S-GW), and has a function of transmission of the user data in accordance with the path of the user data to the terminal apparatus 1, which is configured by the MME 300, etc.

A connection path between the base station apparatus 2-1 or the base station apparatus 2-2 and the SGW 400 is referred to as an SGW interface N10 in FIG. 9 and FIG. 10. Further, a connection path between the base station apparatus 2-1 or the base station apparatus 2-2 and the MME 300 is referred to as an MME interface N20. Further, a connection path between the base station apparatus 2-1 and the base station apparatus 2-2 is referred to as a base station interface N30. The SGW interface N10 is also referred to as an S1-U interface in the EUTRA. Further, the MME interface N20 is also referred to as an S1-MME interface in the EUTRA. Furthermore, the base station interface N30 is also referred to as an X2 interface in the EUTRA.

The architecture realizing the dual connectivity is able to have the configuration of the network like in FIG. 9. In FIG. 9, the base station apparatus 2-1 and the MME 300 are connected by the MME interface N20. Moreover, the base station apparatus 2-1 and the SGW 400 are connected by the SGW interface N10. The base station apparatus 2-1 provides the base station apparatus 2-2 with communication paths with the MME 300 and/or the SGW 400 through the base station interface N30. In other words, the base station apparatus 2-2 is connected to the MME 300 and/or the SGW 400 via the base station apparatus 2-1.

Another architecture realizing the dual connectivity may have a configuration of the network like in FIG. 10. In FIG. 10, the base station apparatus 2-1 and the MME 300 are connected by the MME interface N20. Moreover, the base station apparatus 2-1 and the SGW 400 are connected by the SGW interface N10. The base station apparatus 2-1 provides the base station apparatus 2-2 with a communication path with the MME 300 through the base station interface N30.

In other words, the base station apparatus 2-2 is connected to the MME 300 via the base station apparatus 2-1. Moreover, the base station apparatus 2-2 is connected to the SGW 400 through the SGW interface N10.

Note that, it may be configured such that the base station apparatus 2-2 and the MME 300 are connected directly by the MME interface N20. Further, although the present technique is called with a name of dual connectivity, the number of the base station apparatuses 2 connected to the terminal apparatus 1 is not limited to two, and the terminal apparatus 1 is also able to be connected to three or more base station apparatuses 2.

Description will hereinafter be given in detail for appropriate embodiments of the invention with reference to accompanying drawings while considering above matters. Note that, in the description of the embodiments of the invention, when it is judged that specific description of known functions or configurations involved in the embodiments of the invention makes the subject matter of the embodiments of the invention unclear, the detailed description thereof will be omitted.

First Embodiment

A first embodiment of the invention will be described below.

FIG. 1 is a block diagram illustrating one example of a terminal apparatus 1 according to the first embodiment of the invention. This terminal apparatus 1 is composed of at least a reception unit 101, a demodulation unit 102, a decoding unit 103, a reception data control unit 104, a physical layer control unit 105, a transmission data control unit 106, a coding unit 107, a modulation unit 108, a transmission unit 109, and a radio resource control unit 110. The "unit" in the figure is an element which realizes functions and each procedure of the terminal apparatus 1, which is represented also as a term of a section, a circuit, a configuration device, a device, a unit and the like.

The radio resource control unit 110 is a block which executes each function of an RRC (Radio Resource Control) layer which carries out radio resource control of the terminal apparatus 1. The reception data control unit 104 and the transmission data control unit 106 are blocks which execute each function of an MAC (Medium Access Control) layer, an RLC (Radio Link Control) layer, and a PDCP (Packet Data Convergence Protocol) layer, which manage a data link layer.

Note that, the terminal apparatus 1 may have a configuration including a plurality of reception-based blocks (the reception unit 101, the demodulation unit 102 and the decoding unit 103) for supporting simultaneous reception of a plurality of frequencies (frequency bands, frequency bandwidths) or cells and a plurality of transmission-based blocks (the coding unit 107, the modulation unit 108 and the transmission unit 109) for supporting simultaneous transmission of a plurality of frequencies (frequency bands, frequency bandwidths) or cells by the carrier aggregation and/or the dual connectivity. The terminal apparatus 1 may have a configuration including a plurality of reception data control units 104, a plurality of physical layer control units 105, a plurality of transmission data control units 106, and a plurality of radio resource control units 110.

With regard to reception processing of the terminal apparatus 1, from the radio resource control unit 110, reception data control information is input to the reception data control unit 104, and physical layer control information which is a control parameter for controlling each block is input to the physical layer control unit 105. The physical layer control information is information which includes a parameter configuration required for radio communication control of the terminal apparatus 1, which is formed of reception control information and transmission control information.

The physical layer control information is configured by a radio connection resource configuration, cell-specific broadcast information or a system parameter, which is transmitted in an individual (dedicated) manner from the base station apparatus 2 to the terminal apparatus 1, and input to the physical layer control unit 105 as necessary by radio resource control unit 110. The physical layer control unit 105 appropriately inputs the reception control information which is control information about reception to the reception unit 101, the demodulation unit 102 and the decoding unit 103.

The reception control information includes, as downlink scheduling information, information such as information of a reception frequency band, a reception timing related to physical channels and physical signals, a multiplexing method, and radio resource arrangement information. The reception data control information is downlink control information including secondary cell deactivation timer information, DRX control information, multi-cast data reception information, and downlink retransmission control information, and includes control information about each downlink of the MAC layer, the RLC layer, and the PDCP layer.

A reception signal is received at the reception unit 101. The reception unit 101 receives a signal from the base station apparatus 2 in accordance with a frequency and a frequency band which are designated by the reception control information. The received signal is input to the demodulation unit 102. The demodulation unit 102 performs demodulation of the signal. The demodulation unit 102 inputs the demodulated signal to the decoding unit 103. The decoding unit 103 decodes the input signal and inputs each decoded data (also referred to as downlink data and downlink control data, and downlink transport block) to the reception data control unit 104. An MAC control element transmitted from the base station apparatus 2 with each data is also decoded at the decoding unit 103 and input to the reception data control unit 104.

The reception data control unit 104 controls the physical layer control unit 105 based on the received MAC control element and buffers each decoded data to perform error correction control (HARQ) for retransmitted data. Each data input to the reception data control unit 104 is input (transferred) to the radio resource control unit 110.

Moreover, with regard to transmission processing of the terminal apparatus 1, transmission data control information is input from the radio resource control unit 110 to the transmission data control unit 106, and physical layer control information which is a control parameter for controlling each block is input to the physical layer control unit 105. The physical layer control unit 105 appropriately inputs transmission control information, which is control information about transmission, to the coding unit 107, the modulation unit 108, and the transmission unit 109. The transmission control information includes, as uplink scheduling information, information such as coding information, modulation information, information of a transmission frequency band, a transmission timing related to physical channels and physical signals, a multiplexing method, and radio resource arrangement information.

The transmission data control information is uplink control information which includes DTX control information, random access configuration information, uplink shared channel information, logical channel priority information, resource request configuration information, cell group information, and uplink retransmission control information. The radio resource control unit 110 may configure plural pieces of random access configuration information respectively corresponding to a plurality of cells to the transmission data control unit 106. The radio resource control unit 110 manages transmission timing adjustment information and a transmission timing timer, which are used for adjustment of an uplink transmission timing, and manages a state of the uplink transmission timing (a transmission timing adjustment state or a transmission timing non-adjustment state) for each cell (or for each cell group, each TA group). The transmission timing adjustment information and the transmission timing timer are included in the transmission data control information.

Note that, when it is necessary to manage the state of a plurality of uplink transmission timings, the transmission data control unit 106 manages transmission timing adjustment information corresponding to an uplink transmission timing of each of the plurality of cells (or a cell group and a TA group). The resource request configuration information includes at least maximum transmission counter configuration information and radio resource request prohibit timer information. The radio resource control unit 110 may configure plural pieces of resource request configuration information respectively corresponding to a plurality of cells, respectively, to the transmission data control unit 106.

Transmission data invoked at the terminal apparatus 1 (also referred to as uplink data and uplink control data, and uplink transport block) is input to the transmission data control unit 106 at any timing from the radio resource control unit 110. At this time, the transmission data control unit 106 calculates a quantity of the input transmission data (uplink buffering quantity). Moreover, the transmission data control unit 106 has a function of discriminating whether the input transmission data is data belonging to a control-plane or data belonging to a user-plane.

When transmission data is input to the transmission data control unit 106, the transmission data control unit 106 stores the transmission data in an uplink buffer in the transmission data control unit 106 (not illustrated). The transmission data control unit 106 judges whether a radio resource needed for transmission of the input transmission data is allocated to the terminal apparatus 1. Based on the allocation of the radio resource, the transmission data control unit 106 selects any one of a physical uplink shared channel PUSCH, a radio resource request using a physical uplink control channel (SR-PUCCH) and a radio resource request using a physical random access channel, and requests, to the physical layer control unit 105, control processing for transmitting the selected channel.

That is, when the radio resource has been already allocated and a state in which the transmission data may be transmitted by the physical uplink shared channel PUSCH has come, the coding unit 107 acquires, in accordance with an instruction of the radio resource control unit 110, the transmission data corresponding to the radio resource which has been allocated from the uplink buffer for coding, followed by inputting to the modulation unit 108. Alternatively, when the radio resource has not been allocated and a radio resource request by the physical uplink control channel (SR-PUCCH) is allowed, the coding unit 107 codes control data needed for transmission of the SR-PUCCH in accordance with an instruction of the radio resource control unit 110 and inputs the resultant to the modulation unit 108.

Alternatively, when the radio resource has not been allocated and the radio resource request by the physical uplink control channel (SR-PUCCH) is not allowed, the coding unit 107 instructs the transmission data control unit 106 to start random access procedure. At this time, the coding unit 107 generates a preamble sequence, which is transmitted by the physical random access channel, based on random access configuration information input from the transmission data control unit 106. Moreover, the coding unit 107 appropriately codes each data in accordance with the transmission control information and inputs the resultant to the modulation unit 108.

The modulation unit 108 performs modulation processing appropriately based on a channel structure for transmitting each of coded data. The transmission unit 109 performs mapping of each data subjected to modulation processing to a frequency domain, converts a signal of the frequency domain into a signal of a time domain, and carries it on a carrier wave of a given frequency to perform power amplification. The transmission unit 109 further adjusts an uplink transmission timing in accordance with the transmission timing adjustment information for each cell (or for each cell group or for each TA group) input from the radio resource control unit 110. The physical uplink shared channel in which uplink control data is arranged is able to include, for example, a layer 3 message (radio resource control message; RRC message) in addition to user data.

In FIG. 1, though other components of the terminal apparatus 1 and a transmission path of data (control information) between the components are omitted, it is apparent that a plurality of blocks having other functions necessary for operation as the terminal apparatus 1 are included as components. For example, an NAS layer unit and an application layer unit which carries out control with a core network exist higher than the radio resource control unit 110.

Figure 2:
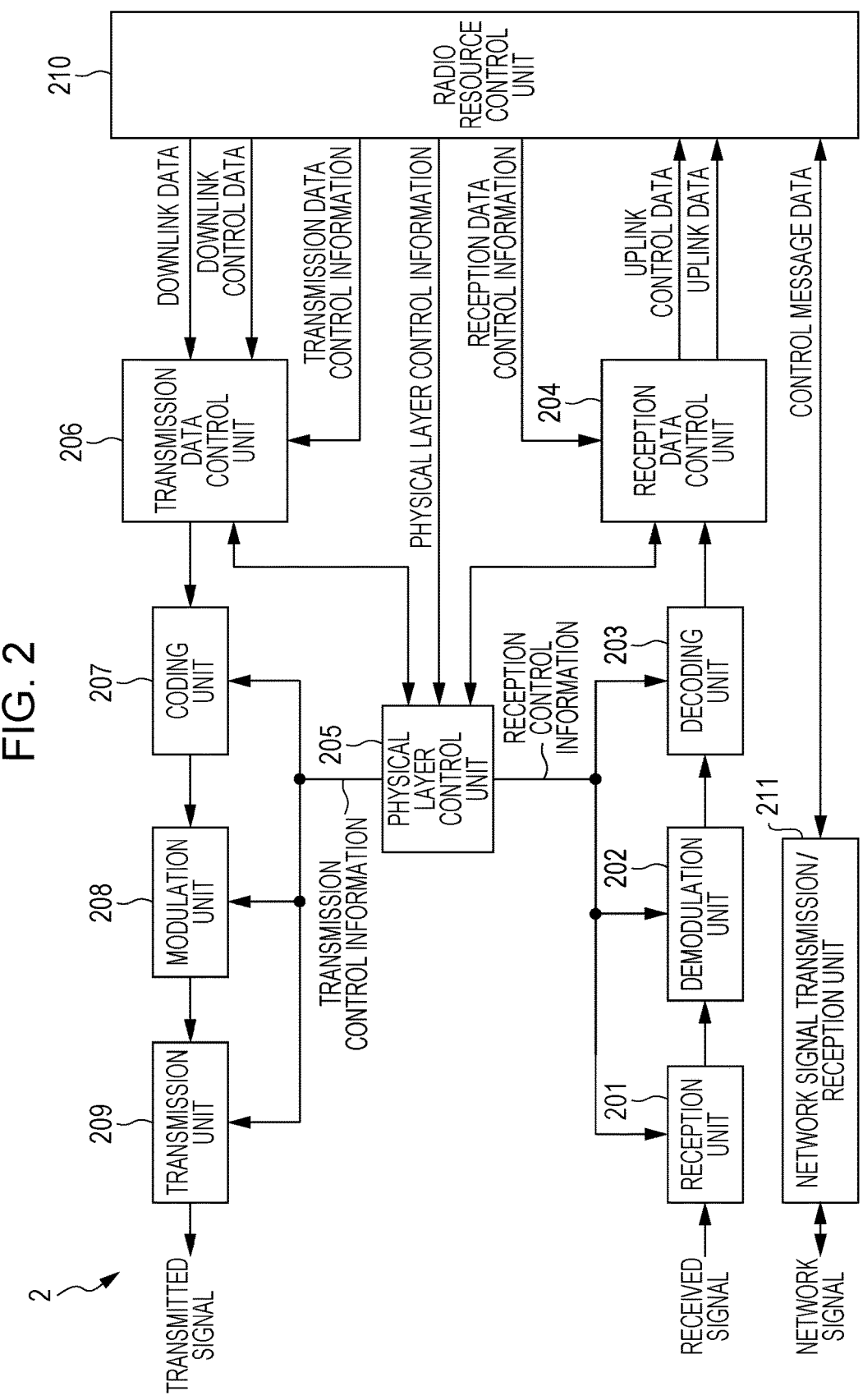
FIG. 2 is a block diagram illustrating one example of a schematic configuration of a base station apparatus according to the embodiment of the invention.

FIG. 2 is a block diagram illustrating one example of the base station apparatus 2 according to the first embodiment of the invention. The present base station apparatus is composed of at least a reception unit 201, a demodulation unit 202, a decoding unit 203, a reception data control unit 204, a physical layer control unit 205, a transmission data control unit 206, a coding unit 207, a modulation unit 208, a transmission unit 209, a radio resource control unit 210, and a network signal transmission/reception unit 211. The "unit" in the figure is an element which executes functions and each procedure of the base station apparatus 2, which is represented also as a term of a section, a circuit, a configuration apparatus, a apparatus, a unit and the like.

The radio resource control unit 210 is a block executing each function of an RRC (Radio Resource Control) layer which carries out radio resource control of the base station apparatus 2. The reception data control unit 204 and the transmission data control unit 206 are blocks executing each function in an MAC (Medium Access Control) layer, an RLC (Radio Link Control) layer, and a PDCP (Packet Data Convergence Protocol) layer which manage a data link layer.

Note that, the base station apparatus 2 may have a configuration including a plurality of reception-based blocks (the reception unit 201, the demodulation unit 202 and the decoding unit 203) and a plurality of transmission-based blocks (the coding unit 207, the modulation unit 208 and the transmission unit 209) for supporting a plurality of frequencies (frequency bands, frequency bandwidths) by the carrier aggregation and/or the dual connectivity. It may have a configuration including a plurality of reception data control units 204, a plurality of physical layer control units 205, a plurality of transmission data control units 206, a plurality of radio resource control units 210, and a plurality of network signal transmission/reception units 211.

The radio resource control unit 210 inputs downlink data and downlink control data to the transmission data control unit 206. When there is an MAC control element to be transmitted to the terminal apparatus 1, the transmission data control unit 206 inputs the MAC control element and each data (downlink data or downlink control data) to the coding unit 207. The coding unit 207 codes the MAC control element and each data, which are input, and inputs the resultant to the modulation unit 208. The modulation unit 208 performs modulation of a coded signal.

The signal modulated by the modulation unit 208 is input to the transmission unit 209. After mapping the input signal into a frequency domain, the transmission unit 209 converts the signal of the frequency domain into a signal of a time domain for transmission by carrying on a carrier wave of a given frequency to perform power amplification. A physical downlink shared channel in which the downlink control data is arranged typically configures a layer 3 message (RRC message).

The reception unit 201 converts a signal received from the terminal apparatus 1 into a base-band digital signal. When cells of a plurality of different transmission timings are configured to the terminal apparatus 1, the reception unit 201 receives a signal at different timings for each cell (or for each cell group or for each TA group). The digital signal converted at the reception unit 201 is input to the demodulation unit 202 and demodulated. The signal demodulated at the demodulation unit 202 is subsequently input to the decoding unit 203. The decoding unit 203 decodes the input signal and inputs each decoded data (uplink data and uplink control data) to the reception data control unit 204. The MAC control element which is transmitted from the terminal apparatus 1 with each data is also decoded at the decoding unit 203 and input to the reception data control unit 204.

The reception data control unit 204 controls the physical layer control unit 205 based on the received MAC control element and buffers each decoded data to perform error correction control (HARQ) for retransmitted data. Each data input to the reception data control unit 204 is input (transferred) to the radio resource control unit 210.

Physical layer control information needed for control of each of the blocks is information including a parameter configuration needed for radio communication control of the base station apparatus 2, which is composed of reception control information and transmission control information. The physical layer control information is configured by a higher network apparatus (MME (MME 300), gateway apparatus (SGW 400), OAM or the like) or a system parameter, and input to the control unit 204 as necessary by the radio resource control unit 210.

The physical layer control unit 205 inputs the physical layer control information involved in transmission as the transmission control information to each of the blocks of the coding unit 207, the modulation unit 208 and the transmission unit 209, and the physical layer control information involved in reception as the reception control information to each of the blocks of the reception unit 201, the demodulation unit 202 and the decoding unit 203.

The reception data control information includes control information about the uplink of the terminal apparatus 1, which corresponds to each of the MAC layer, the RLC layer, and the PDCP layer of the base station apparatus 2. The transmission data control information includes control information about the downlink of the terminal apparatus 1, which corresponds to each of the MAC layer, the RLC layer, and the PDCP layer of the base station apparatus 2. That is, the reception data control information and the transmission data control information are configured for each terminal apparatus 1.

The network signal transmission/reception unit 211 performs transmission (transfer) or reception of a control message or user data between the base station apparatuses 2 or between a higher network apparatus (the MME 300 or the SGW 400) and the base station apparatus 2. In FIG. 2, though other components of the base station apparatus 2 and a transmission path of data (control information) between the components are omitted, it is apparent that a plurality of blocks having other functions necessary for operation as the base station apparatus 2 are included as components. For example, a radio resource management unit and an application layer unit exist on top of the radio resource control unit 210.

Figure 3:
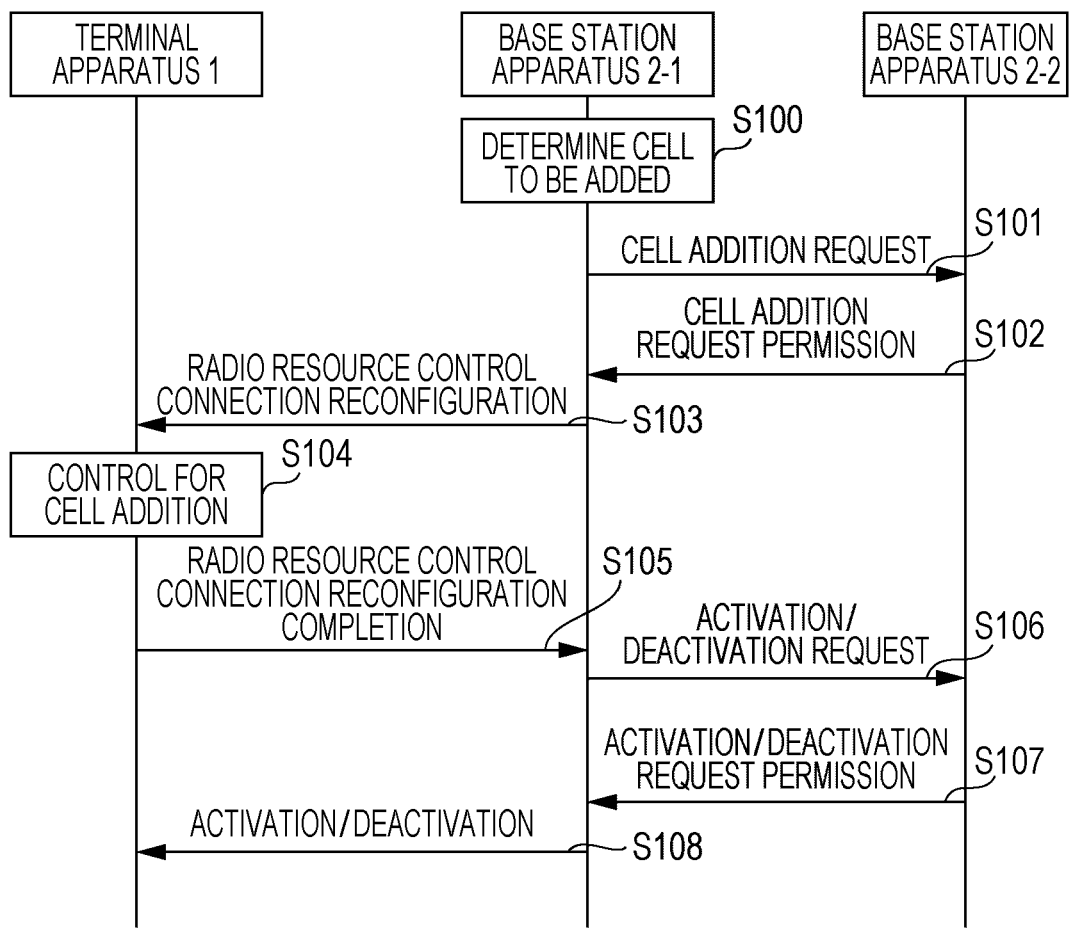
FIG. 3 is one example of a sequence chart illustrating procedure of controlling a state of a cell according to a first embodiment of the invention.

FIG. 3 illustrates one example of a sequence chart related to procedure of controlling a state of a cell, which is used for activation and/or deactivation of a secondary cell in the first embodiment of the invention.

In FIG. 3, it is considered that each of the base station apparatuses 2 (the base station apparatus 2-1 and the base station apparatus 2-2) is able to be connected to the terminal apparatus 1 by using the dual connectivity technique. The terminal apparatus 1 is in a state of being connected to the base station apparatus 2-1. Among the base station apparatuses 2, the base station apparatus 2-1 typically manages a macro cell and the base station apparatus 2-2 typically manages a small cell, but an application range of the present embodiment is not limited by types of cells.

First, the base station apparatus 2-1 determines a cell to be added (secondary cell) by using dual connectivity to the terminal apparatus 1 at step S100. The base station apparatus 2-1 may determine the cell subjected to control for a state of a cell based on one of information of, for example, (1) a buffer status of uplink reported by a buffer status report of the terminal apparatus 1, (2) a measurement event report or a CSI report, which fulfills a trigger condition in the secondary cell, (3) load condition of the base station apparatuses 2 or the cell, and (4) a mobility speed of the terminal apparatus 1, or a combination thereof. The base station apparatus 2-1 is also able to determine the cell to be added, by using other information.

The base station apparatus 2-1 which has determined the cell to be added creates and transmits a cell addition request message to the base station apparatus 2-2 which manages the cell to be added (step S101). The cell addition request message may be transmitted as a message between base station apparatuses (X2-AP message) or transmitted as an MME message (S1-AP message) which goes through the MME. The cell addition request message may be a dual connectivity request message, or may be a handover request message.

The cell addition request message includes, for example, an identifier of a message between base station apparatuses, a base station apparatus identifier for uniquely identifies the base station apparatus 2-1, a cell identifier (a physical cell ID or a cell global identifier) of a cell of the base station apparatus 2-2 which requests addition, a terminal apparatus identifier of the terminal apparatus 1 which is a target for addition, and the like. The terminal apparatus identifier may be a C-RNTI (cell radio network temporary identifier; Cell-Radio. Network Temporary Identifier) which is individually allocated to the terminal apparatus 1 in the cell. The base station apparatus 2-1 is also able to include a plurality of cell identifiers (physical cell IDs or cell global identifiers) of cells of the base station apparatus 2-2 in the cell addition request message.

When judging that the cell requested by the base station apparatus 2-1 is able to be connected to the terminal apparatus 1 by using the dual connectivity, the base station apparatus 2-2 which has received the cell addition request message transmits a cell addition request permission message to the base station apparatus 2-1 (step S102). The cell addition request permission message may be transmitted as a message between base station apparatuses (X2-AP message) or transmitted as an MME message (S1-AP message) which goes through the MME. The cell addition request permission message may be a dual connectivity setup message, or may be a handover request permission (Handover Request Acknowledge) message.

The cell addition request permission message includes, for example, an identifier of a message between base station apparatuses of the corresponding cell addition request message, an identifier of a message between base station apparatuses of the cell addition request permission message, a cell identifier (a physical cell ID or a cell global identifier) of a cell of the base station apparatus 2-2 which has permitted the addition, a cell configuration (broadcast information) of the cell of the base station apparatus 2-2 which has permitted the addition, and the like. Note that, the base station apparatus 2-2 may designate a cell different from the requested cell with the cell addition request permission message.

In order to add (configure) the cell permitted to be added, which is designated with the cell addition request permission message, the base station apparatus 2-1 which has received the cell addition request permission message generates a radio resource control connection reconfiguration message to transmit to the terminal apparatus 1 (step S103).

When receiving the radio resource control connection reconfiguration message, the terminal apparatus 1 performs control for cell addition at step S104, and performs the instructed addition of the cell of the base station apparatus 2-2. The addition of the cell may be performed with the same procedure of adding a secondary cell by the carrier aggregation. That is, the radio resource control connection reconfiguration message includes a cell ID of the cell to be added (secondary cell), an identifier of the secondary cell, a cell shared configuration and a cell individual configuration, a secondary cell deactivation timer information, and the like. Here, the secondary cell which is newly added has a state of cell deactivated (deactivation).

The terminal apparatus 1 which has completed the addition of the cell transmits a radio resource control connection reconfiguration completion message to the base station apparatus 2-1 (step S105).

The base station apparatus 2-1 which has received the message of step S105 is able to know that the addition of the cell is completed normally. When judging that the state of the secondary cell needs to be changed based on scheduling, the base station apparatus 2-1 then generates and transmits a message for instructing activation and/or deactivation (Activation/Deactivation request message) of the cell added to the base station apparatus 2-2 (step S106).

The Activation/Deactivation request message includes, for example, an identifier of a message between base station apparatuses, a base station apparatus identifier for uniquely identifying the base station apparatus 2-1, a cell identifier (a physical cell ID or a cell global identifier) of the cell of the base station apparatus 2-2 which requests activation/deactivation, and the like. The base station apparatus 2-1 is also able to include timing information indicating a timing of activation/deactivation of the cell in the Activation/Deactivation request message. The timing information is time information which is usable for synchronizing the timing of activation/deactivation in the base station apparatus 2-1 and the base station apparatus 2-2, and examples thereof include a system frame time, a UTC (Coordinated Universal Time) without limitation. The base station apparatus 2-2 is also able to include information of a plurality of cells in the Activation/Deactivation request message.

When judging that the cell requested by the base station apparatus 2-1 may be activated (deactivated), the base station apparatus 2-2 which has received the Activation/Deactivation request message transmits an Activation/Deactivation request permission message to the base station apparatus 2-1 (step S107). The Activation/Deactivation request message and the Activation/Deactivation request permission message may be transmitted as a message between base station apparatuses (X2-AP message) or transmitted as an MME message (S1-AP message) which goes through the MME.

The Activation/Deactivation request permission message includes, for example, an identifier of a message between base station apparatuses of the corresponding Activation/Deactivation request message, an identifier of a message between base station apparatuses of the Activation/Deactivation request permission message, a cell identifier (a physical cell ID or a cell global identifier) of the cell of the base station apparatus 2-2 which permits activation/deactivation, and the like. The base station apparatus 2-2 is also able to include information of a plurality of cells in the Activation/Deactivation request permission message.

In order to activate (deactivate) the cell designated with the Activation/Deactivation request permission message, the base station apparatus 2-1 which has received the Activation/Deactivation request permission message crates an MAC control element indicating activation/deactivation (Activation/Deactivation MAC control element) of the secondary cell to transmit to the terminal apparatus 1 (step S108). The MAC control element indicating activation/deactivation of the secondary cell is transmitted by the physical downlink shared channel PDSCH (being included in the PDSCH).

A control method illustrated in FIG. 3 is suitable as a method that, when activation (deactivation) is performed for the cell of the base station apparatus 2-2, the base station apparatus 2-1 recognizes the changed state of the cell of the base station apparatus 2-2 to mutually share the state of the cell.

Figure 4:
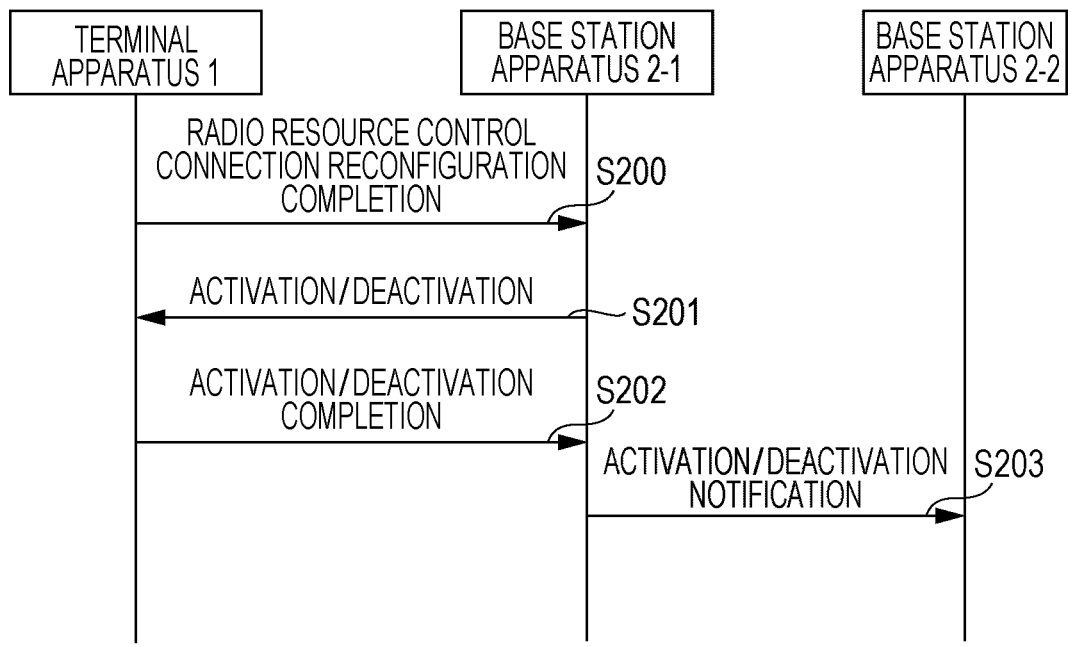
FIG. 4 is another example of a sequence chart illustrating procedure of controlling a state of a cell according to the first embodiment of the invention.

FIG. 4 illustrates another example of a sequence chart related to procedure of controlling a state of a cell used for activation and/or deactivation of a secondary cell in the first embodiment of the invention. Each of the terminal apparatus 1, the base station apparatus 2-1, and the base station apparatus 2-2 of FIG. 4 is able to have a configuration similar to one described in FIG. 3.

At a start point of time of the sequence of FIG. 4, the terminal apparatus 1 is connected to the cell of the base station apparatus 2-2 by using the dual connectivity, and therefore has received the radio resource control connection reconfiguration message indicating addition of the cell of the base station apparatus 2-2. When the procedure of cell addition is normally completed, the terminal apparatus 1 transmits a radio resource control connection reconfiguration completion message indicating the completion of the addition of the cell to the base station apparatus 2-1 (step S200).

In order to activate (deactivate) the cell designated with the Activation/Deactivation request permission message, the base station apparatus 2-1 generates an MAC control element indicating activation/deactivation (Activation/Deactivation MAC control element) of the secondary cell to transmit to the terminal apparatus 1 (step S201). The MAC control element indicating activation/deactivation of the secondary cell is transmitted by using the physical downlink shared channel PDSCH (being included in the PDSCH).

As confirmation of reception of the PDSCH including the MAC control element indicating activation/deactivation of the secondary cell, the terminal apparatus 1 transmits ACK corresponding to the PDSCH to the base station apparatus 2-1. Note that, when the PDSCH is not able to be received correctly, the terminal apparatus 1 transmits NACK to the base station apparatus 2-1. The terminal apparatus 1 notifies the base station apparatus 2-1 of completion of Activation/Deactivation by transmission of the ACK (step S202).

In order to notify the base station apparatus 2-2 of the secondary cell which is activated/deactivated in the terminal apparatus 1, the base station apparatus 2-1 then transmits an Activation/Deactivation notification message to the base station apparatus 2-2 (step S203).

The Activation/Deactivation notification message includes, for example, an identifier of a message between base station apparatuses, a base station apparatus identifier for uniquely identifying the base station apparatus 2-1, a cell identifier (a physical cell ID or a cell global identifier) of the cell of the base station apparatus 2-1, which has performed activation/deactivation, a terminal apparatus identifier, and the like.

The Activation/Deactivation notification message may be transmitted as a message between base station apparatuses (X2-AP message) or transmitted as an MME message (S1-AP message) which goes through the MME.

Note that, when not explicitly indicating activation/deactivation to the terminal apparatus 1, specifically, as to the secondary cell of the base station apparatus 2-1, the state of which is changed due to expiration of the secondary cell deactivation timer, the base station apparatus 2-1 may notify a state of the secondary cell by using the Activation/Deactivation notification message.

A control method illustrated in FIG. 4 is suitable as a method that, when activation (deactivation) is performed for the cell of the base station apparatus 2-1, the base station apparatus 2-2 recognizes the changed state of the cell of the base station apparatus 2-1 to mutually share the state of the cell.

In FIG. 3 and FIG. 4, the radio resource control connection reconfiguration message may be an RRC Connection Reconfiguration message, and the radio resource control connection reconfiguration completion message may be an RRC Connection Reconfiguration Complete message.

Figure 5:
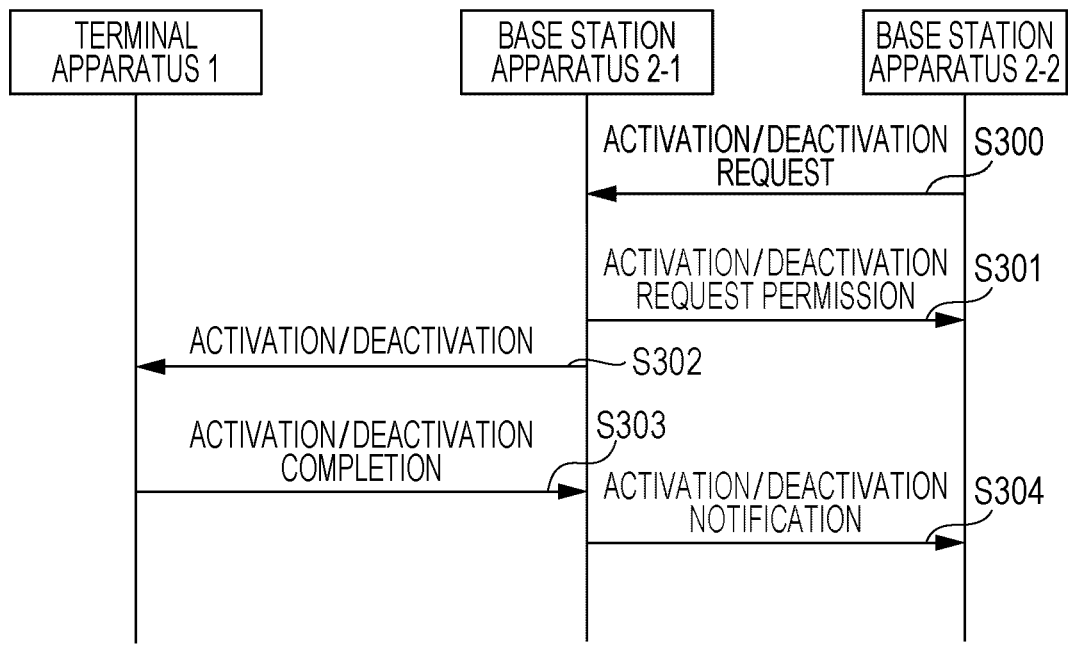
FIG. 5 is another example of a sequence chart illustrating procedure of controlling a state of a cell according to the first embodiment of the invention.

FIG. 5 illustrates another example of a sequence chart related to procedure of controlling a state of a cell used for activation and/or deactivation of a secondary cell in the first embodiment of the invention. Each of the terminal apparatus 1, the base station apparatus 2-1, and the base station apparatus 2-2 of FIG. 5 is able to have a configuration similar to one described in FIG. 3. Among respective messages in FIG. 5, details of messages which have been described in other figures will be omitted.

In FIG. 5, each of the base station apparatus 2-1 and the base station apparatus 2-2 is connected to the terminal apparatus 1 by using the dual connectivity.

First, when judging that the state of the secondary cell needs to be changed based on scheduling, the base station apparatus 2-2 generates and transmits a message for instructing activation and/or deactivation (Activation/Deactivation request message) of the cell added to the base station apparatus 2-1 (step S300).

When judging that the cell requested by the base station apparatus 2-2 is able to be activated (deactivated), the base station apparatus 2-1 which has received the Activation/Deactivation request message transmits an Activation/Deactivation request permission message to the base station apparatus 2-2 (step S301).

Note that, when the Activation/Deactivation request by the base station apparatus 2-2 is permitted at all times, step S301 may be omitted.

In order to subsequently activate (deactivate) the cell designated with the Activation/Deactivation request permission message, the base station apparatus 2-1 generates an MAC control element indicating activation/deactivation (Activation/Deactivation MAC control element) of the secondary cell to transmit to the terminal apparatus 1 (step S302). The MAC control element indicating activation/deactivation of the secondary cell is transmitted by using the physical downlink shared channel PDSCH (being included in the PDSCH).

As confirmation of reception of the PDSCH including the MAC control element indicating activation/deactivation of the secondary cell, the terminal apparatus 1 transmits ACK corresponding to the PDSCH to the base station apparatus 2-1. Note that, when the PDSCH is not able to be received correctly, the terminal apparatus 1 transmits NACK to the base station apparatus 2-1. The terminal apparatus 1 notifies the base station apparatus 2-1 of completion of Activation/Deactivation by transmission of the ACK (step S303).

In order to notify the base station apparatus 2-2 of the secondary cell which is activated/deactivated in the terminal apparatus 1, the base station apparatus 2-1 then transmits an Activation/Deactivation notification message to the base station apparatus 2-2 (step S304).

Note that, the base station apparatus 2-1 may transmit an Activation/Deactivation request permission message in response to the Activation/Deactivation request message at step S304 instead of the Activation/Deactivation notification message.

A control method illustrated in FIG. 5 is suitable as a method that, when activation (deactivation) is performed for the cell of the base station apparatus 2-2, the base station apparatus 2-1 recognizes the changed state of the cell of the base station apparatus 2-2 to mutually share the state of the cell. It is particularly suitable when the base station apparatus 2-2 is able to change the state of the cell autonomously.

Such a configuration allows the terminal apparatus 1 and the base station apparatuses 2 to transfer (exchange, share) information of states (activation, deactivation) of the secondary cells with the base station apparatus 2-1 and the base station apparatus 2-2, so that is it possible to avoid a problem associated with inconsistency of states of the secondary cells, in particular, a problem that a secondary cell which is not used, that is, a secondary cell which is deactivated is activated and a secondary cell which is used, that is, a secondary cell which is activated is deactivated.

The terminal apparatus 1 of the present embodiment is able to use a conventional control method even when being connected by the dual connectivity by appropriately controlling a state of a cell in the base station apparatuses 2, so that a complicate operation becomes unnecessary. Further, by performing transfer by using a message between base station apparatuses as to the state of activation/deactivation of the secondary cell, when the terminal apparatus 1 is connected to a plurality of cells by using the dual connectivity, the base station apparatuses 2 of the present embodiment become able to notify the state of the cell of the different base station apparatus 2 to the other base station apparatus 2. That is, the base station apparatuses 2 become possible to cause the terminal apparatus 1 to control the state of the cell efficiently even in a network in which a delay is caused in a backbone line between the base station apparatuses 2.

According to the first embodiment, in accordance with a command for instructing activation and/or deactivation of a secondary cell, the terminal apparatus 1 is able to have means for appropriately controlling states of activation and deactivation of the cell by using a conventional control method, thus making it possible to control states of the cells efficiently. Further, by performing transfer by using a message between base station apparatuses as to states of activation/deactivation of the secondary cell, the base station apparatuses 2 are able to provide means for appropriately controlling the state of the cell while eliminating inconsistence of the states between the base station apparatuses 2, thus making it possible to prevent reduction in throughput by performing efficient scheduling for the terminal apparatus 1.

Second Embodiment

A second embodiment of the invention will be described below.

In the first embodiment, a reason why a control message associated with activation and/or deactivation of the secondary cell needs to be transferred between the base station apparatuses 2 is that the cell of the base station apparatus 2-2 is deactivated. That is, if it is ensured that the secondary cell of the base station apparatus 2-2 does not become in a deactivated state and is always regarded as being activated, the base station apparatus 2-1 does not require information about the state of the secondary cell of the base station apparatus 2-2. Thus, the second embodiment indicates a method for controlling the state of the secondary cell, by which the secondary cell is able to be always activated, in the base station apparatuses 2.

Configurations of the terminal apparatus 1 and the base station apparatuses 2 of the second embodiment may be the same as configurations of the first embodiment, so that the description thereof will be omitted. However, the terminal apparatus 1 and the base station apparatuses 2 of the second embodiment have a function of regarding a part of cells as being always activated (described below).

As the control method in the second embodiment, any of following control methods may be used. (1) For example, in order to prevent the secondary cell from being deactivated by the secondary cell deactivation timer, the base station apparatuses 2 perform scheduling for the secondary cell related to the base station apparatus 2-2 before the secondary cell deactivation timer expires, to thereby restart the secondary cell deactivation timer.

Performing scheduling is transmitting a PDCCH for allocating a radio resource to any of the cells configured to the terminal apparatus 1, by the cell of the base station apparatus 2-2. Moreover, performing scheduling is transmitting a PDCCH for allocating a radio resource to a cell of the base station apparatus 2-2 configured to the terminal apparatus 1, by any of the cells configured to the terminal apparatus 1.

In this manner, since the secondary cell deactivation timer is restarted by performing scheduling before the cell of the base station apparatus 2-2 is deactivated, the terminal apparatus 1 and the base station apparatuses 2 are able to regard the cell of the base station apparatus 2-2 as being always activated.

(2) Moreover, for example, in order to prevent the secondary cell from being deactivated by the secondary cell deactivation timer, the base station apparatuses 2 do not configure the secondary cell deactivation timer for the secondary cell related to the base station apparatus 2-2.

Specifically, the base station apparatuses 2 notify the terminal apparatus 1 of information indicating the secondary cell (or a cell group including a plurality of cells) to which the secondary cell deactivation timer is not applied. The base station apparatuses 2 may notify, for example, a cell ID of the corresponding secondary cell, a serving cell index, or a secondary cell index. Further, the base station apparatuses 2 may notify, for example, information indicating that the secondary cell deactivation timer is not applied, by including in a configuration for each secondary cell. For notifying the configuration of the secondary cell to which the secondary cell deactivation timer is not applied, an RRC message (for example, a radio resource control connection reconfiguration message) may be used or an MAC control element may be used.

The terminal apparatus 1 configures (applies) the secondary cell deactivation timer for each secondary cell in the same manner as a conventional one to ones other than the secondary cell to which the secondary cell deactivation timer is not applied. On the other hand, the terminal apparatus 1 does not configure (apply) the secondary cell deactivation timer to the secondary cell to which the secondary cell deactivation timer is not applied. That is, the terminal apparatus 1 does not perform start, stop, or restart of the secondary cell deactivation timer in the designated secondary cell.

In this manner, since the secondary cell deactivation timer is not configured to the cell of the base station apparatus 2-2, the terminal apparatus 1 and the base station apparatuses 2 are able to regard the cell of the base station apparatus 2-2 as being always activated.

(3) Moreover, for example, in order to prevent the secondary cell from being deactivated by the secondary cell deactivation timer, the base station apparatuses 2 configures the secondary cell deactivation timer for the secondary cell related to the base station apparatus 2-2 to be infinity.

Specifically, the base station apparatuses 2 notify the terminal apparatus 1 of information (configuration) indicating that a value of the secondary cell deactivation timer is infinity as to the secondary cell (or a cell group including a plurality of cells) which is not to be deactivated. The base station apparatuses 2 may notify, for example, a cell ID of the corresponding secondary cell, a serving cell index, or a secondary cell index. Further, the base station apparatuses 2 may notify, for example, information indicating that the secondary cell deactivation timer is not applied, by including in a configuration for each secondary cell.

When the secondary cell deactivation timer is configured for each of the base station apparatuses 2 which are connected, information indicating that a value of the secondary cell deactivation timer is infinity and identifiers (which may be connectivity identifiers) of the corresponding base station apparatus 2 may be notified. For notifying the configuration of the secondary cell in which the secondary cell deactivation timer is set to be infinity, the base station apparatuses 2 may use an RRC message (for example, a radio resource control connection reconfiguration message) or may use an MAC control element.

The terminal apparatus 1 configures (applies) the value configured as the secondary cell deactivation timer to each secondary cell. That is, the terminal apparatus 1 controls start, stop, and restart of the secondary cell deactivation timer in the same manner as a conventional one, but the timer of the secondary cell, whose value is designated to be infinity, does not expire, so that deactivation is not performed.

In this manner, since the secondary cell deactivation timer of the cell of the base station apparatus 2-2 is configured to be infinity, the terminal apparatus 1 and the base station apparatuses 2 are able to regard the cell of the base station apparatus 2-2 as being always activated.

(4) Moreover, for example, in order to prevent the secondary cell from being deactivated by the secondary cell deactivation timer, the terminal apparatus 1 regards the secondary cell deactivation timer for the secondary cell related to the base station apparatus 2-2 to be infinity.

Specifically, the base station apparatuses 2 notify the terminal apparatus 1 of information (configuration) indicating that control is performed by regarding the value of the secondary cell deactivation timer to be infinity as to the secondary cell (or a cell group including a plurality of cells) which is not to be deactivated. The base station apparatuses 2 may notify, for example, a cell ID of the corresponding secondary cell, a serving cell index, or a secondary cell index. Further, the base station apparatuses 2 may notify, for example, information indicating that control is performed by regarding the secondary cell deactivation timer to be infinity, by including in a configuration for each secondary cell.

When the secondary cell deactivation timer is configured for each of the base station apparatuses 2 which are connected, information indicating that a value of the secondary cell deactivation timer is regarded as being infinity and identifiers (which may be connectivity identifiers) of the corresponding base station apparatuses 2 may be notified. For notifying the configuration of the secondary cell in which the secondary cell deactivation timer is regarded as being infinity, the base station apparatuses 2 may use an RRC message (for example, a radio resource control connection reconfiguration message) or may use an MAC control element.

The terminal apparatus 1 configures (applies) the secondary cell deactivation timer for each secondary cell in the same manner as a conventional one for ones other than the secondary cell in which the secondary cell deactivation timer is not regarded as being infinity. On the other hand, the terminal apparatus 1 configures (applies) the secondary cell deactivation timer by regarding it to be infinity as to the secondary cell in which the secondary cell deactivation timer is regarded as being infinity. That is, the terminal apparatus 1 controls start, stop, and restart of the secondary cell deactivation timer in the same manner as a conventional one, but the timer of the secondary cell, whose value is designated to be regarded as being infinity, does not expire, so that deactivation is not performed.

In this manner, when the secondary cell deactivation timer of the cell of the base station apparatus 2-2 is regarded as being infinity, the terminal apparatus 1 and the base station apparatuses 2 are able to regard the cell of the base station apparatus 2-2 as being always activated.

(5) Moreover, for example, in order to prevent the secondary cell from being deactivated by the secondary cell deactivation timer, the terminal apparatus 1 does not count the time on the secondary cell deactivation timer for the secondary cell related to the base station apparatus 2-2.

Specifically, the base station apparatuses 2 notify the terminal apparatus 1 of information (configuration) indicating the secondary cell (or a cell group including a plurality of cells) for which the terminal apparatus 1 does not count the time on the secondary cell deactivation timer. The base station apparatuses 2 may notify, for example, a cell ID of the corresponding secondary cell, a serving cell index, or a secondary cell index. Further, the base station apparatuses 2 may notify, for example, information indicating that the time on the secondary cell deactivation timer is not counted by including in a configuration for each secondary cell. For notifying the configuration of the secondary cell for which the terminal apparatus 1 does not count the time on the secondary cell deactivation timer, an RRC message (for example, a radio resource control connection reconfiguration message) may be used or an MAC control element may be used.

The terminal apparatus 1 configures (applies) the secondary cell deactivation timer for each secondary cell in the same manner as a conventional one to ones other than the secondary cell for which the terminal apparatus 1 does not count the time on the secondary cell deactivation timer. On the other hand, the terminal apparatus 1 configures (applies) the secondary cell deactivation timer to the secondary cell for which the terminal apparatus 1 does not count the time on the secondary cell deactivation timer, but does not perform control associated with counting the time. That is, the terminal apparatus 1 does not perform start, stop, and restart of the secondary cell deactivation timer in the designated secondary cell.

In this manner, by not performing control associated with counting the time by the secondary cell deactivation timer of the cell of the base station apparatus 2-2, the terminal apparatus 1 and the base station apparatuses 2 are able to regard the cell of the base station apparatus 2-2 as being always activated.

Such a configuration allows the terminal apparatus 1 and the base station apparatuses 2 to know the state of secondary cell without exchanging information about the state (activation, deactivation) of the secondary cell between the base station apparatus 2-1 and the base station apparatus 2-2, so that is it possible to avoid a problem associated with inconsistency of the state of the secondary cell, in particular, a problem that a secondary cell which is not used, that is, a secondary cell which is deactivated is activated and a secondary cell which is used, that is, a secondary cell which is activated is deactivated.

By appropriately controlling the state of the cell in the base station apparatuses 2 or by performing appropriate control for not deactivating the state of the cell designated by the base station apparatuses 2, the terminal apparatus 1 of the present embodiment is able to avoid occurrence of inconsistency of the state of the secondary cell even when being connected by the dual connectivity. The base station apparatuses 2 of the present embodiment are able to notify the terminal apparatus 1 of an appropriate configuration for not being deactivated as to a state of a part of cells. The base station apparatuses 2 of the present embodiment become not required to perform exchange by using a message between base station apparatuses as to the state of activation/deactivation of the secondary cell, so that an amount of signaling is reduced. That is, the base station apparatuses 2 become possible to cause the terminal apparatus 1 to control the state of the cell efficiently even in a network in which a delay is caused in a backbone line between the base station apparatuses 2.

According to the second embodiment, the terminal apparatus 1 is able to have means for controlling a part of cells used for connection so as not to be deactivated, so that management of the state of the cell becomes simple, thus making it possible to control the state of the cell efficiently. Further, the base station apparatuses 2 are able to provide means for appropriately controlling the state of the cell while eliminating inconsistency of the state between the base station apparatuses 2 as to the state of the cell configured to the terminal apparatus 1, thus making it possible to prevent reduction in throughput by performing efficient scheduling for the terminal apparatus 1.

Third Embodiment

A third embodiment of the invention will be described below.

As described above, there is a delay in the backbone line between the base station apparatuses 2. Therefore, notifying information about the state of the secondary cell from the terminal apparatus 1 is likely to achieve higher speed than exchanging a message between base station apparatuses, which is associated with the state of the secondary cell, between the base station apparatus 2-1 and the base station apparatus 2-2. Then, the third embodiment indicates a method for notifying information about the state of the secondary cell from the terminal apparatus 1.

Configurations of the terminal apparatus 1 and the base station apparatuses 2 of the third embodiment may be the same as configurations of the first embodiment, so that the description thereof will be omitted. However, in the third embodiment, the terminal apparatus 1 has a function of transmitting (notifying) information about the state of the secondary cell to the base station apparatuses 2, and the base station apparatuses 2 have a function of receiving the information about the state of the secondary cell from the terminal apparatus 1 (described below).

Figure 6:
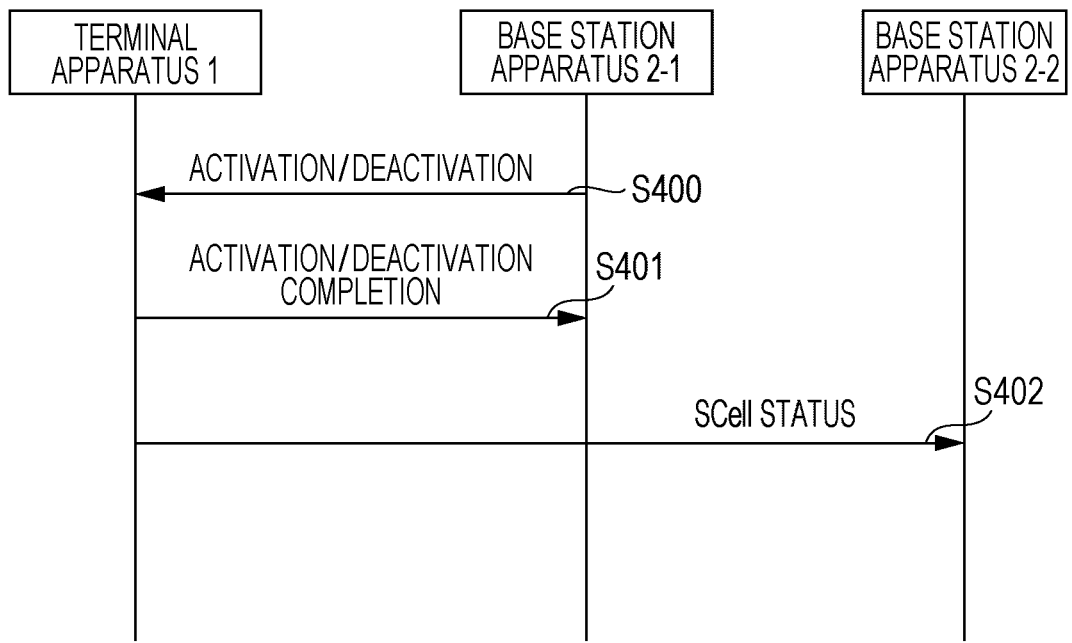
FIG. 6 is one example of a sequence chart illustrating procedure of controlling a state of a cell according to a third embodiment of the invention.

FIG. 6 illustrates one example of a sequence chart related to procedure of controlling a state of a cell used for activation and/or deactivation of a secondary cell in the third embodiment of the invention. The terminal apparatus 1, the base station apparatus 2-1, and the base station apparatus 2-2 of FIG. 6 may have the same configurations as those described in FIG. 3, and details of the messages described in another figure among respective messages in FIG. 6 will be omitted.

In FIG. 6, each of the base station apparatus 2-1 and the base station apparatus 2-2 is connected to the terminal apparatus 1 by using the dual connectivity.

First, when judging that a state of a secondary cell needs to be changed based on scheduling, the base station apparatus 2-1 generates an MAC control element indicating activation/deactivation (Activation/Deactivation MAC control element) of the secondary cell to transmit to the terminal apparatus 1 (step S400). The MAC control element indicating activation/deactivation of the secondary cell is transmitted by using the physical downlink shared channel PDSCH (being included in the PDSCH).

As confirmation of reception of the PDSCH including the MAC control element indicating activation/deactivation of the secondary cell, the terminal apparatus 1 transmits ACK corresponding to the PDSCH to the base station apparatus 2-1. Note that, when the PDSCH is not received correctly, the terminal apparatus 1 transmits NACK to the base station apparatus 2-1. The terminal apparatus 1 notifies the base station apparatus 2-1 of completion of Activation/Deactivation by transmission of the ACK (step S401).

Subsequently, the terminal apparatus 1 transmits a secondary cell state notification (SCell status) to the base station apparatuses 2 other than the base station apparatus 2 to which the cell for which activation and/or deactivation is performed belongs (step S402). In the example of FIG. 6, the terminal apparatus 1 performs activation and/or deactivation targeting the cell of the base station apparatus 2-1, and thus transmits the secondary cell state notification to the other base station apparatus 2-2.

Note that, the secondary cell state notification may be transmitted by using an RRC message or may be transmitted by using an MAC control element. When the RRC message is used, the terminal apparatus 1 may use a measurement report message again. That is, when having performed control associated with the state of the secondary cell (activation, deactivation), by regarding that a trigger condition of a measurement report message is satisfied, the terminal apparatus 1 transmits the measurement report message including information indicating the current state of the secondary cell.

Figure 8:
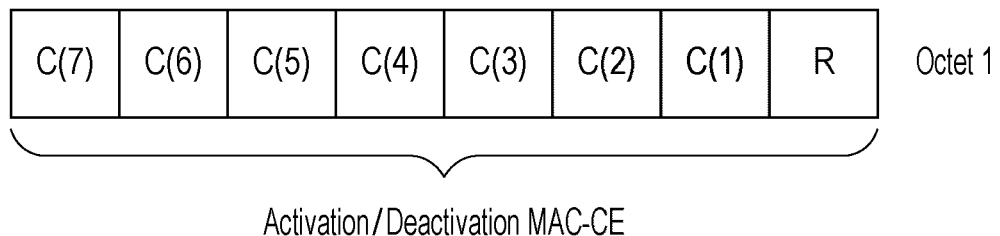
FIG. 8 is a view for explaining a format of control elements used for conventional control of states of cells.

When using the MAC control element, the terminal apparatus 1 may transmit control information similar to the MAC control element illustrated in FIG. 8 by using the physical uplink shared channel PUSCH (being included in the PUSCH). That is, when having performed control associated with the state of the secondary cell (activation, deactivation), the terminal apparatus 1 transmits an MAC control element including information indicating the current state of the secondary cell.

Alternatively, when using the MAC control element, the terminal apparatus 1 may use an MAC control element of a PH reporting (Power Headroom Reporting) indicating a headroom of transmit power again. That is, when having performed control associated with the state of the secondary cell (activation, deactivation), the terminal apparatus 1 judges that a trigger condition of the PH reporting is satisfied and generates an MAC control element of the PH reporting. The MAC control element of the PH reporting is transmitted by using the physical uplink shared channel PUSCH (being included in the PUSCH).

Note that, in order for the terminal apparatus 1 to judge whether or not to perform control according to the present embodiment, the base station apparatuses 2 may notify the terminal apparatus 1 of a configuration (information) indicating whether or not the secondary cell state notification is transmitted.

Figure 7:
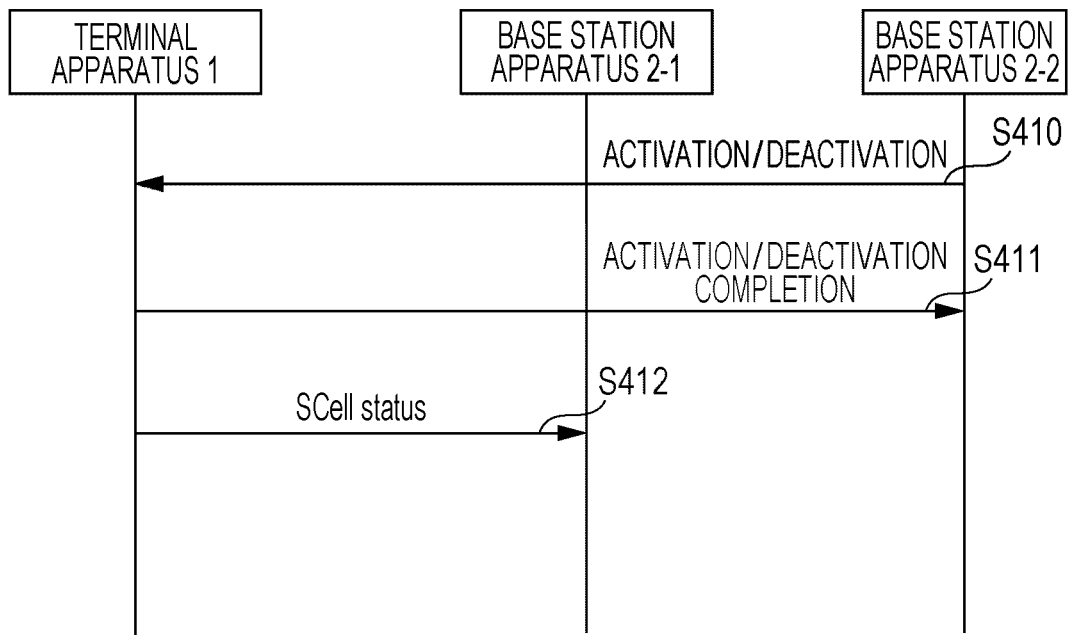
FIG. 7 is another example of a sequence chart illustrating procedure of controlling a state of a cell according to the third embodiment of the invention.

FIG. 7 illustrates another example of a sequence chart related to procedure of controlling a state of a cell used for activation and/or deactivation of a secondary cell in the third embodiment of the invention. FIG. 7 is different from FIG. 6 in that, for example, an MAC control element indicating activation/deactivation of the secondary cell is transmitted from the base station apparatus 2-2 (step S410 and step S411), and a secondary cell state notification is transmitted to the base station apparatus 2-1 (step S412). However, the method for controlling the secondary cell, the trigger condition for the secondary cell state notification, contents of information notified from the terminal apparatus 1, and the like are the same as those described in FIG. 6, and thus will not be described in detail.

Note that, when having received the MAC control element indicating activation/deactivation of the secondary cell from a different base station apparatus 2, the terminal apparatus 1 may control the state of the secondary cell in accordance with an MAC control element indicating activation/deactivation of the latest secondary cell. Further, when having received the MAC control element indicating activation/deactivation of the secondary cell from the different base station apparatus 2, the terminal apparatus 1 may control the state of the secondary cell by ignoring the MAC control element indicating activation/deactivation of the secondary cell other than the first one.

Such a configuration allows the terminal apparatus 1 and the base station apparatuses 2 to notify the base station apparatus 2-1 and the base station apparatus 2-2 of information about the state of the secondary cell (activation, deactivation) via the terminal apparatus 1, so that is it possible to avoid a problem associated with inconsistency of the state of the secondary cell, in particular, a problem that a secondary cell which is not used, that is, a secondary cell which is deactivated is activated and a secondary cell which is used, that is, a secondary cell which is activated is deactivated.

By notifying the base station apparatuses 2 of a state of a cell at an appropriate timing, the terminal apparatus 1 of the present embodiment is able to avoid occurrence of inconsistency of the state of the secondary cell even when being connected by the dual connectivity. The base station apparatuses 2 of the present embodiment become not required to perform exchange by using a message between base station apparatuses as to the state of activation/deactivation of the secondary cell, so that an amount of signaling is reduced. That is, the base station apparatuses 2 become possible to cause the terminal apparatus 1 to control the state of the cell efficiently even in a network in which a delay is caused in a backbone line between the base station apparatuses 2.

According to the third embodiment, since the terminal apparatus 1 is able to provide the base station apparatuses 2 with information about the state of the secondary cell appropriately, the control method becomes efficient. Further, the base station apparatuses 2 are able to provide means for appropriately controlling the state of the cell while eliminating inconsistency of the state between the base station apparatuses 2 as to the state of the cell configured to the terminal apparatus 1, thus making it possible to prevent reduction in throughput by performing efficient scheduling for the terminal apparatus 1.

Note that, the embodiments described above are only exemplifications, and may be realized by using various modified examples and substitution examples. For example, the uplink transmission scheme may be applied also to communication systems of both an FDD (frequency division duplex) scheme and a TDD (time division duplex) scheme. In addition, respective parameter names indicated in the embodiments are given for convenience of description, and even when parameter names in practical use and parameter names of the embodiments of the invention are different, there is no influence on the gist of the invention which is claimed by the embodiments of the invention.

"Connection" used in the each of the embodiments is not limited only to a configuration in which a certain apparatus and a certain different apparatus are directly connected by using a physical line, and also includes a configuration of logical connection and a configuration of wireless connection by using wireless technologies.

The terminal apparatus 1 includes all apparatuses having a communication function, such as not only a portable or movable mobile station apparatus, but also stationary or unmovable electronic equipment which is installed indoors and outdoors such as, for example, AV equipment, kitchen equipment, a cleaning/washing machine, air conditioning equipment, office equipment, an automatic vending machine, other domestic equipment, measurement equipment, an in-vehicle apparatus, and further, wearable equipment which is wearable, or healthcare equipment. Further, the terminal apparatus 1 is used not only for person to person or person to equipment communication, but also for equipment to equipment communication (Machine Type Communication), and device to device communication (D2D).

The terminal apparatus 1 is also referred to as a user terminal, a mobile station apparatus, a communication terminal, a mobile equipment, a terminal, UE (User Equipment), or an MS (Mobile Station). Each of the base station apparatuses 2 is also referred to as a radio base station apparatus, a base station, a radio base station, a fixed station, NB (NodeB), eNB (evolved NodeB), a BTS (Base Transceiver Station), or a BS (Base Station).

Note that, each of the base station apparatuses 2 is referred to as NB in UMTS which is prescribed by 3GPP, and as eNB in the EUTRA and the Advanced EUTRA. Note that, the terminal apparatus 1 in the UMTS prescribed by 3GPP, the EUTRA, and the Advanced EUTRA, is referred to as UE.

Further, though description has been given for the terminal apparatus 1 and the base station apparatuses 2 of the embodiments by using functional block diagrams for convenience of description, as to steps of a method, means or algorithm for realizing functions or a part of functions of each unit of the terminal apparatus 1 and the base station apparatuses 2, they may be embodied directly in hardware, in a software module executed by a processor, or in a combination of these two.

If being implemented in software, the function may be held or transmitted as one or more commands or codes on a computer readable medium. The computer readable media include both communication media and computer recording media including a medium that facilitates transferring a computer program from one place to another place.

Then, control of the terminal apparatus 1 and the base station apparatuses 2 may be performed by recording one or more commands or codes in a computer readable recording medium and causing a computer system to read the one or more commands or codes recorded in this recording medium for execution. Note that, the "computer system" here is set to include an OS and hardware such as peripheral equipment.

Operations described in each of the embodiments of the invention may be realized by a program. The program which is operated at the terminal apparatus 1 and the base station apparatuses 2 related to each of the embodiments of the invention is a program which controls a CPU or the like so as to realize the functions of the aforementioned embodiments related to each of the embodiments of the invention (program causing a computer to function). In addition, information handled in these apparatuses is temporarily accumulated in a RAM during processing thereof, and then stored in various ROMs or HDDs to be read out by the CPU as necessary, for correction and writing.

In addition, although the functions of the embodiments described above are realized by executing the program, the functions of each of the embodiments of the invention are also realized in some cases by performing processing based on instructions of the program in conjunction with an operating system, other application programs or the like.

Moreover, the "computer readable recording medium" refers to a portable medium such as a semiconductor medium (for example, such as a RAM or a nonvolatile memory card), an optical recording medium (for example, such as a DVD, an MO, an MD, a CD or a BD), a magnetic recording medium (for example, a magnetic tape or a flexible disk), or a storage apparatus including a disc unit embedded in a computer system. Further, the "computer readable recording medium" includes one which dynamically holds a program for a short time, such as a communication line in a case where the program is transmitted through a network such as the Internet or a communication line such as a telephone line, and one which holds a program for a fixed time, such as a volatile memory inside a computer system serving as a server or a client in the above case.

The aforementioned program may be one for realizing a part of the functions described above, and further may be one capable of realizing the functions described above by being combined with a program which has been already recorded in a computer system.

Each functional block or various features of the terminal apparatus 1 and the base station apparatus 2 used in each of the embodiments described above may be implemented or executed by a general-purpose processor, a digital signal processor (DSP), an application specific or general application integrated circuit (ASIC), a field programmable gate array signal (FPGA), or other programmable logic apparatuses, discrete gates or transistor logic, a discrete hardware component, which is designed to execute the functions described in the present specification, or a combination thereof.

The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit.

The processor may be implemented also as a combination with a computing apparatus. For example, a DSP and a microprocessor, a plurality of microprocessors, one or more microprocessors connected to a DSP core, or other such configurations are combined.

As above, the embodiments of the invention have been described in detail based on specific examples, however, it is clear that a gist of each embodiment and a scope of Claims of the present invention are not limited to these specific examples, and design change and the like which are not departed from the gist of the invention are also included. That is, the description in the present specification aims to give exemplary description and does not give any limitation to each embodiment of the present invention.

The invention can be modified in various manners within the scope defined by the Claims, and embodiments obtained by appropriately combining technical means disclosed in different embodiments are also encompassed by the technical scope of the invention. The configuration in which elements described in each of the aforementioned embodiments and achieving similar effects are replaced with each other is also encompassed in the technical scope of the invention.

INDUSTRIAL APPLICABILITY

The invention is able to be applied to a mobile phone, a personal computer, a tablet computer, and the like.

DESCRIPTION OF REFERENCE NUMERALS 1 terminal apparatus
2, 2-1, 2-2 base station apparatus
101, 201 reception unit
102, 202 demodulation unit
103, 203 decoding unit
104, 204 reception data control unit 105, 205 physical layer control unit
106, 206 transmission data control unit
107, 207 coding unit
108, 208 modulation unit
109, 209 transmission unit
110, 210 radio resource control unit
211 network signal transmission/reception unit
300 MME
400 SGW

The invention claimed is:

1. A terminal apparatus configured and/or programmed to communicate with a first base station apparatus and a second base station apparatus, the terminal apparatus comprising:
 first circuitry configured and/or programmed to
  add cells associated with dual connectivity based on a radio resource control (RRC) message transmitted from the first base station apparatus,
   the cells including a first cell and a plurality of secondary cells, the first cell being designated by a cell identifier included in the RRC message and is not deactivatable, and the plurality of secondary cells being other than the first cell and is deactivatable, and
 second circuitry configured and/or programmed to
  apply a deactivation timer to each of the plurality of secondary cells, not to the first cell, the deactivation timer being used to deactivate a cell, wherein
  the first cell and the plurality of secondary cells are designated as being activated or deactivated by a MAC control element (MAC CE) including at least one bit and when a secondary cell of the plurality of secondary cells corresponding to an index representing a bit value of the MAC CE is not configured to the terminal apparatus, the terminal apparatus ignores the bit value of the index.

2. The terminal apparatus according to claim 1, wherein the second circuitry is configured and/or programmed to deactivate each of the plurality of secondary cells for which the deactivation timer expires.

3. The terminal apparatus according to claim 1, wherein the first circuitry configured and/or programmed to
  receive the RRC message from the first base station apparatus, and
  add the cells as cells of the second base station apparatus, based on the RRC message.

4. A base station apparatus configured and/or programmed to communicate with a terminal apparatus, the base station apparatus comprising:
 first circuitry configured and/or programmed to
  notify the terminal apparatus of addition of cells associated with dual connectivity, by a radio resource control (RRC) message,
   the cells including a first cell and a plurality of secondary cells, the first cell being designated by a cell identifier included in the RRC message and is not deactivatable, and the plurality of secondary cells being other than the first cell and is deactivatable,
 second circuitry configured and/or programmed to
  notify the terminal apparatus of a deactivation timer, in a case of notifying the terminal apparatus of the addition of the cells, the deactivation timer being applied to each of the plurality of secondary cells, not to the first cell and
  deactivate each of the plurality of secondary cells, which has been activated, in a case of expiration of the deactivation timer, wherein
  the first cell and the plurality of secondary cells are designated as being activated or deactivated by a MAC control element (MAC CE) including at least one bit and when a secondary cell of the plurality of secondary cells corresponding to an index representing a bit value of the MAC CE is not configured to the terminal apparatus, the terminal apparatus ignores the bit value of the index.

5. A control method of a terminal apparatus configured and/or programmed to communicate with a first base station apparatus and a second base station apparatus, the control method comprising:
 adding cells associated with dual connectivity based on a radio resource control (RRC) message transmitted from the first base station apparatus;
  the cells including a first cell and a plurality of secondary cells, the first cell being designated by a cell identifier included in the RRC message and is not deactivatable, and the plurality of secondary cells other than the first cell is deactivatable, and
 performing applying a deactivation timer to each of the plurality of secondary cells, not to the first cell, the deactivation timer being used to deactivate a cell, wherein
  the first cell and the plurality of secondary cells are designated as being activated or deactivated by a MAC control element (MAC CE) including at least one bit and when a secondary cell of the plurality of secondary cells corresponding to an index representing a bit value of the MAC CE is not configured to the terminal apparatus, the terminal apparatus ignores the bit value of the index.

6. A control method of a base station apparatus configured and/or programmed to communicate with a terminal apparatus, the control method comprising:
 notifying the terminal apparatus of addition of cells associated with dual connectivity, by a radio resource control (RRC) message;
  the cells including a first cell and a plurality of secondary cells, the first cell being designated by a cell identifier included in the RRC message and is not deactivatable, and the plurality of a secondary cells being other than the first cell is deactivatable, and
 notifying the terminal apparatus of a deactivation timer, in a case of notifying the terminal apparatus of the addition of the cells, the deactivation timer being applied to each of the plurality of secondary cells, not to the first cell, and
 deactivating each of the plurality of secondary cells, which has been activated, in a case of expiration of the deactivation timer, wherein
  the first cell and the plurality of secondary cells are designated as being activated or deactivated by a MAC control element (MAC CE) including at least one bit and when a secondary cell of the plurality of secondary cells corresponding to an index representing a bit value of the MAC CE is not configured to the terminal apparatus, the terminal apparatus ignores the bit value of the index.

* * * * *